US009093013B2

(12) United States Patent
Tsukagoshi

(10) Patent No.: US 9,093,013 B2
(45) Date of Patent: Jul. 28, 2015

(54) SYSTEM, APPARATUS, AND METHOD FOR IMAGE PROCESSING AND MEDICAL IMAGE DIAGNOSIS APPARATUS

(75) Inventor: Shinsuke Tsukagoshi, Nasushiobara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/552,941

(22) Filed: Jul. 19, 2012

(65) Prior Publication Data

US 2013/0181977 A1    Jul. 18, 2013

(30) Foreign Application Priority Data

Jul. 19, 2011    (JP) ................................ 2011-158224

(51) Int. Cl.
*G09G 5/14* (2006.01)
*H04N 13/00* (2006.01)
*H04N 13/02* (2006.01)

(52) U.S. Cl.
CPC .............. *G09G 5/14* (2013.01); *H04N 13/004* (2013.01); *H04N 13/0275* (2013.01); *H04N 13/0282* (2013.01); *H04N 13/0292* (2013.01)

(58) Field of Classification Search
CPC .................. G06T 2207/30068; G06T 7/0032; G06T 7/0038; G06T 15/08; G06T 2207/30172; G06T 11/008; G06T 2207/10088; G06T 2207/10116; G06T 2207/30104; G06T 2211/412; G06T 7/0075; G06T 2207/10012; G06T 7/0044; G06T 7/204; A61N 2005/1061; A61N 5/1049; A61N 5/1067; G06K 2209/053; G06K 9/6209; G06K 2209/05; G06K 9/00751; G06K 9/4671; G06K 9/621; G06K 9/6203;A61B 3/102; A61B 6/027; A61B 6/032; A61B 6/463; A61B 6/482; A61B 6/502; A61B 6/5205; A61B 6/541; A61B 8/0833; A61B 6/022; A61B 1/00193; A61B 6/466; G06F 17/30843; G06F 17/175; G06F 19/321; G06F 19/3437; G06F 19/3468; H04N 13/0055; H04N 13/004
USPC .......................................... 345/419
See application file for complete search history.

(56) References Cited

U.S. PATENT DOCUMENTS

| | | | | |
|---|---|---|---|---|
| 5,396,418 | A * | 3/1995 | Heuscher ......................... | 378/15 |
| 2007/0236514 | A1* | 10/2007 | Agusanto et al. ............. | 345/646 |
| 2011/0007957 | A1* | 1/2011 | Sakagawa ..................... | 382/131 |
| 2011/0033094 | A1* | 2/2011 | Zarkh et al. ................... | 382/128 |
| 2012/0113096 | A1* | 5/2012 | Estrada ......................... | 345/419 |

FOREIGN PATENT DOCUMENTS

JP    2005-86414    3/2005

OTHER PUBLICATIONS

Trial Decision mailed May 30, 2013, in JP Patent No. 5173053; Demand for Trial; and corrected Specification (with English-language translations)

* cited by examiner .

*Primary Examiner* — Kee M Tung
*Assistant Examiner* — Haixia Du
(74) *Attorney, Agent, or Firm* — Oblon, McClelland, Maier & Neustadt, L.L.P.

(57) ABSTRACT

In an image processing system, a selecting unit selects a group of reference parallax images to be used as a reference, from among a plurality of groups of parallax images generated from image data taken chronologically; an image quality changing unit changes an image quality of at least one selected from between the selected group of reference parallax images and a group of parallax images contained in the groups of parallax images; and a display control unit causes images to be displayed that are formed by combining the group of parallax images contained in the groups of parallax images with the image-quality-changed group of reference parallax images, or by combining the selected group of reference parallax images with the image-quality-changed group of parallax images, or by combining together the image-quality-changed group of reference parallax images and the image-quality-changed group of parallax images contained in the groups of parallax images.

12 Claims, 15 Drawing Sheets

FIG.9
(A) 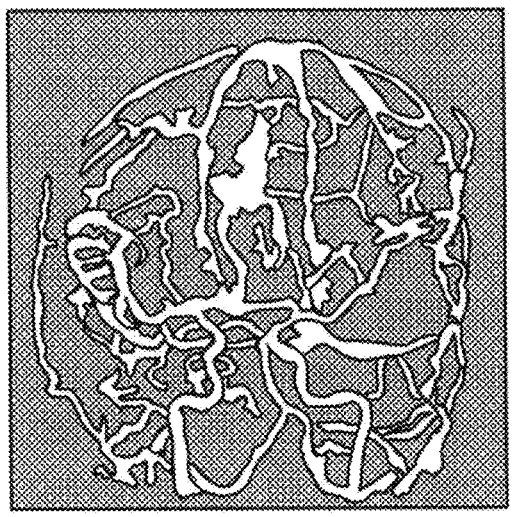
(B) 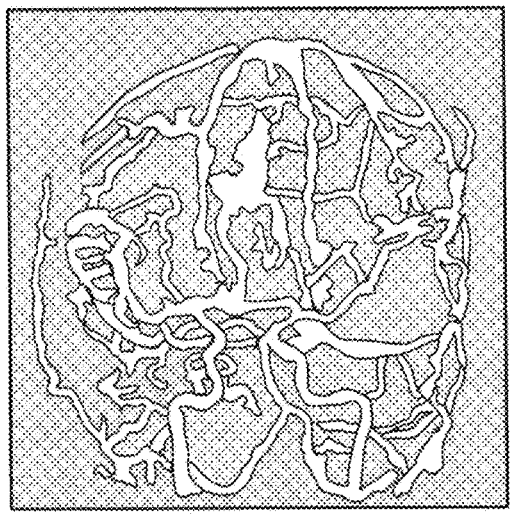

SYSTEM, APPARATUS, AND METHOD FOR IMAGE PROCESSING AND MEDICAL IMAGE DIAGNOSIS APPARATUS

CROSS-REFERENCE TO RELATED APPLICATION(S)

This application is based upon and claims the benefit of priority from Japanese Patent Application No. 2011-158224, filed on Jul. 19, 2011; the entire contents of which are incorporated herein by reference.

FIELD

Embodiments described herein relate generally to a system, an apparatus, and a method for image processing and a medical image diagnosis apparatus.

BACKGROUND

Conventionally, monitors enabling an observer to view two-parallax images captured from two viewpoints stereoscopically by using a specific device, such as a pair of stereoscopic vision glasses, have been in practical use. Furthermore, in recent years, monitors enabling an observer to view multi-parallax images (e.g., nine-parallax images) captured from a plurality of viewpoints stereoscopically with the naked eyes by using a beam control element, such as a lenticular lens, have also been in practical use. Such two-parallax images and nine-parallax images displayed on monitors enabling stereoscopic vision may be generated by estimating depth information of an image captured from one viewpoint and performing image processing with the information thus estimated.

As for medical image diagnosis apparatuses, such as X-ray computed tomography (CT) apparatuses, magnetic resonance imaging (MRI) apparatuses, and ultrasound diagnosis apparatuses, apparatuses capable of generating three-dimensional medical image data (hereinafter, referred to as volume data) have been in practical use. Conventionally, volume data generated by such a medical image diagnosis apparatus is converted into a two-dimensional image by various types of image processing, and is displayed two-dimensionally on a general-purpose monitor. For example, volume data generated by a medical image diagnosis apparatus is converted into a two-dimensional image that reflects three-dimensional information by volume rendering processing, and is displayed two-dimensionally on a general-purpose monitor.

In the conventional techniques, however, it is sometimes difficult to have three-dimensional information understood when chronological image data is displayed.

BRIEF DESCRIPTION OF THE DRAWINGS

FIG. 9 is a drawing for explaining an example of a process performed by an image quality changing unit according to the first embodiment;

DETAILED DESCRIPTION

According to an embodiment, an image processing system includes a selecting unit, an image quality changing unit, a display control unit. The selecting unit configured to select a group of reference parallax images to be used as a reference, from among a plurality of groups of parallax images generated from image data taken chronological. The image quality changing unit configured to change an image quality of at least one selected from between the group of reference parallax images selected by the selecting unit and a group of parallax images contained in the plurality of groups of parallax images. The display control unit configured to cause images to be displayed that are formed by combining the group of parallax images contained in the plurality of groups of parallax images with the group of reference parallax images of which the image quality was changed by the image quality changing unit, or by combining the group of reference parallax images selected by the selecting unit with the group of parallax images of which the image quality was changed by the image quality changing unit, or by combining together the group of reference parallax images and the group of parallax images contained in the plurality of groups of parallax images of which the image qualities were changed by the image quality changing unit.

Hereinafter, embodiments of a system, an apparatus, and a method for image processing and a medical image diagnosis apparatus will be described in detail with reference to the accompanying drawings. In the following, an image processing system including a workstation with a function as an image processing apparatus is described as an embodiment. Here, the terminology used in the following embodiments is described. A "parallax image group" refers to an image group which is generated by performing a volume rendering process on volume data while moving a point-of-view position by a predetermined parallactic angle at a time. In other words, the "parallax image group" is configured with a plurality of "parallax images" having different "point-of-view positions." Further, a "parallactic angle" refers to an angle determined by an adjacent point-of-view position among point-of-view positions set to generate the "parallax image group" and a predetermined position in a space (the center of a space) represented by volume data. Further, a "parallax number" refers to the number of "parallax images" necessary to implement a stereoscopic view by a stereoscopic display monitor. Further, a "nine-parallax image" described in the following refers to a "parallax image group" consisting of nine "parallax images." Furthermore, a "two-parallax image" described in the following refers to a "parallax image group" consisting of two "parallax images."

First Embodiment

Figure 1:
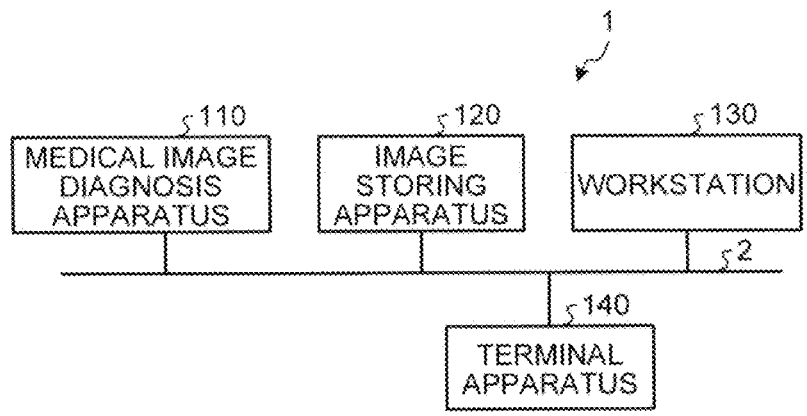
FIG. 1 is a drawing for explaining an exemplary configuration of an image processing system according to a first embodiment.

First, a configuration example of an image processing system according to a first embodiment will be described. FIG. 1 is a diagram for explaining an exemplary configuration of an image processing system according to a first embodiment.

As illustrated in FIG. 1, an image processing system 1 according to the first embodiment includes a medical image diagnosis apparatus 110, an image storage device 120, a workstation 130, and a terminal device 140. The respective devices illustrated in FIG. 1 are connected to directly or indirectly communicate one another, for example, via a hospital Local Area Network (LAN) 2 installed in a hospital. For example, when a Picture Archiving and Communication System (PACS) is introduced into the image processing system 1, the respective devices exchange a medical image or the like with one another according to a Digital Imaging and Communications in Medicine (DICOM) standard.

The image processing system 1 generates a parallax image group from volume data, which is three-dimensional medical image data, generated by the medical image diagnosis apparatus 110, and displays the parallax image group on a monitor enabling stereoscopic vision. Thus, the image processing system 1 provides a medical image capable of being viewed stereoscopically to a doctor or a laboratory technician who works for the hospital. Specifically, in the first embodiment, the workstation 130 performs various types of image processing on volume data to generate a parallax image group. The workstation 130 and the terminal device 140 have a monitor enabling stereoscopic vision, and display the parallax image group generated by the workstation 130 on the monitor. The image storage device 120 stores therein the volume data generated by the medical image diagnosis apparatus 110 and the parallax image group generated by the workstation 130. In other words, the workstation 130 and the terminal device 140 acquire the volume data and the parallax image group from the image storage device 120 to process the volume data and to display the parallax image group on the monitor. The devices will be explained below in order.

The medical image diagnosis apparatus 110 is an X-ray diagnosis apparatus, an X-ray Computed Tomography (CT) apparatus, a Magnetic Resonance Imaging (MRI) apparatus, an ultrasonic diagnostic device, a Single Photon Emission Computed Tomography (SPECT) device, a Positron Emission computed Tomography (PET) apparatus, a SPECT-CT apparatus in which a SPECT apparatus is integrated with an X-ray CT apparatus, a PET-CT apparatus in which a PET apparatus is integrated with an X-ray CT apparatus, a device group thereof, or the like. The medical image diagnosis apparatus 110 according to the first embodiment can generate 3D medical image data (volume data).

Specifically, the medical image diagnosis apparatus 110 according to the first embodiment captures a subject, and generates volume data. For example, the medical image diagnosis apparatus 110 generates volume data such that it collects data such as projection data or an MR signal by capturing a subject, and then reconstructs medical image data including a plurality of axial planes along a body axis direction of a subject based on the collected data. The medical image diagnosis apparatus 110 reconstructs medical image data of 500 axial planes, for example. The medical image data group of 500 axial planes corresponds to volume data. Alternatively, projection data or an MR signal of a subject captured by the medical image diagnosis apparatus 110 may be used as volume data.

The medical image diagnosis apparatus 110 according to the first embodiment transmits the generated volume data to the image storage device 120. When the medical image diagnosis apparatus 110 transmits the volume data to the image storage device 120, the medical image diagnosis apparatus 110 transmits supplementary information such as a patient ID identifying a patient, an inspection ID identifying an inspection, a apparatus ID identifying the medical image diagnosis apparatus 110, and a series ID identifying single shooting by the medical image diagnosis apparatus 110, for example.

The image storage device 120 is a database that stores a medical image. Specifically, the image storage device 120 according to the first embodiment stores volume data transmitted from the medical image diagnosis apparatus 110 in a storage unit to store the volume data therein. Further, in the first embodiment, the workstation 130 generates a parallax image group based on the volume data, and transmits the generated parallax image group to the image storage device 120. Thus, the image storage device 120 stores a parallax image group transmitted from the workstation 130 in the storage unit to store the parallax image group therein. Further, in the present embodiment, the workstation 130 capable of storing a large amount of images may be used, and in this case, the image storage device 120 illustrated in FIG. 1 may be incorporated with the workstation 130 illustrated in FIG. 1. In other words, in the present embodiment, the volume data or the parallax image group may be stored in the workstation 130.

Further, in the first embodiment, the volume data or the parallax image group stored in the image storage device 120 is stored in association with the patient ID, the inspection ID, the apparatus ID, the series ID, and the like. Thus, the workstation 130 or the terminal device 140 performs a search using the patient ID, the inspection ID, the apparatus ID, the series ID, or the like, and acquires necessary volume data or a necessary parallax image group from the image storage device 120.

The workstation 130 is an image processing apparatus that performs image processing on a medical image. Specifically, the workstation 130 according to the first embodiment performs various types of rendering processing on the volume data acquired from the image storage device 120 to generate a parallax image group. The parallax image group is a plurality of parallax images captured from a plurality of viewpoints. A parallax image group displayed on a monitor enabling an observer to view nine-parallax images stereoscopically with the naked eyes is nine parallax images whose viewpoint positions are different from one another.

The workstation 130 according to the first embodiment includes a monitor enabling stereoscopic vision (hereinafter, referred to as a stereoscopic display monitor) as a display unit. The workstation 130 generates a parallax image group, and displays the parallax image group thus generated on the stereoscopic display monitor. As a result, an operator of the workstation 130 can perform an operation for generating the parallax image group while checking a medical image that is displayed on the stereoscopic display monitor and capable of being viewed stereoscopically.

The workstation 130 transmits the parallax image group thus generated to the image storage device 120. When transmitting the parallax image group to the image storage device 120, the workstation 130 transmits the patient ID, the examination ID, the apparatus ID, and the series ID, for example, as additional information. Examples of the additional information transmitted when the workstation 130 transmits the parallax image group to the image storage device 120 include additional information related to the parallax image group. Examples of the additional information related to the parallax image group include the number of parallax images (e.g., "nine") and the resolution of the parallax image (e.g., "466× 350 pixels").

To generate and display multi-parallax images sequentially, the workstation 130 according to the first embodiment generates and displays parallax images of different parallax positions alternately between continuous time-phase data. As a result, the workstation 130 can display sequential multi-parallax images smoothly even if the sequential multi-parallax images are generated and displayed in real time. This operation will be described later in detail.

The terminal device 140 is a device that allows a doctor or a laboratory technician who works in the hospital to view a medical image. Examples of the terminal device 140 include a Personal Computer (PC), a tablet-type PC, a Personal Digital Assistant (PDA), and a portable telephone, which are operated by a doctor or a laboratory technician who works in the hospital. Specifically, the terminal device 140 according to the first embodiment includes a stereoscopic display monitor as a display unit. Further, the terminal device 140 acquires a parallax image group from the image storage device 120, and causes the acquired parallax image group to be displayed on the stereoscopic display monitor. As a result, a doctor or a laboratory technician who is an observer can view a stereoscopically viewable medical image.

Here, the stereoscopic display monitor included in the workstation 130 or the terminal device 140 will be described. A general-purpose monitor which is currently most widely used two dimensionally displays a two-dimensional (2D) image and hardly performs a 3D display on a 2D image. If an observer desires a stereoscopic view to be displayed on the general-purpose monitor, a device that outputs an image to the general-purpose monitor needs to parallel-display a two-parallax image stereoscopically viewable to an observer through a parallel method or an intersection method. Alternatively, a device that outputs an image to the general-purpose monitor needs to display an image stereoscopically viewable to an observer through a color-complementation method using glasses in which a red cellophane is attached to a left-eye portion and a blue cellophane is attached to a right-eye portion.

Meanwhile, there are stereoscopic display monitors that allow a two-parallax image (which is also referred to as a "binocular parallax image") to be stereoscopically viewed using a dedicated device such as stereoscopic glasses.

Figure 2A:
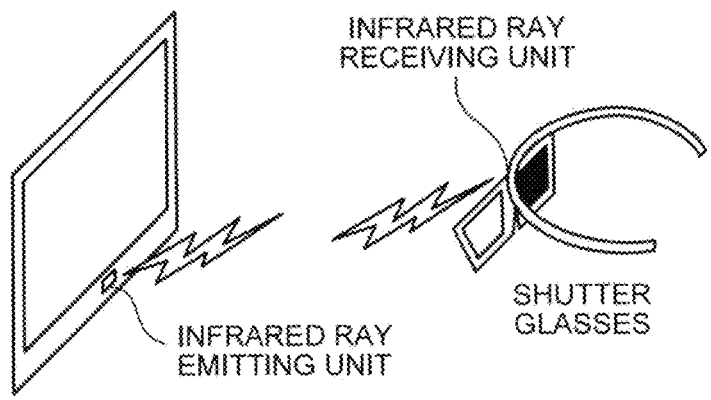
FIGS. 2A and 2B are drawings for explaining an example of a stereoscopic display monitor that realizes a stereoscopic display by using two-eye parallax images.
Figure 2B:
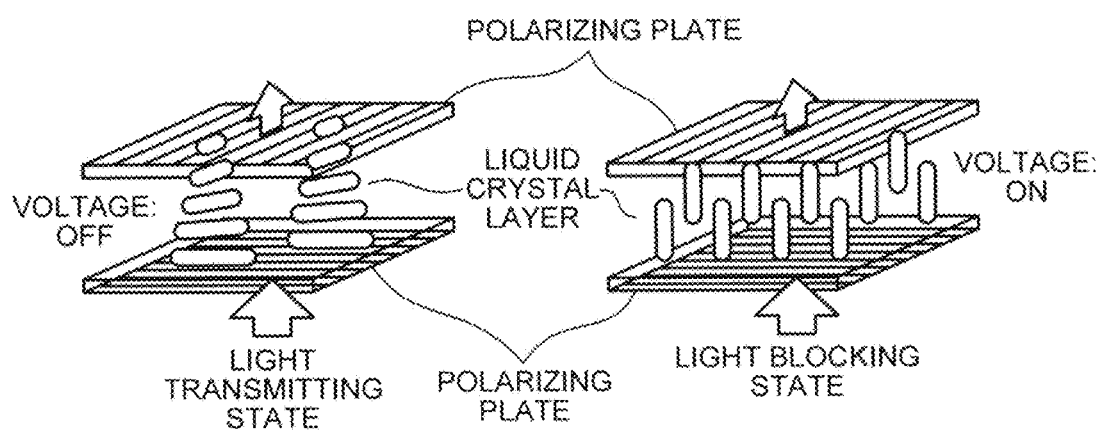

FIG. 2A and FIG. 2B are schematics for explaining an example of a stereoscopic display monitor that performs stereoscopic display using two-parallax images. In the example illustrated in FIGS. 2A and 2B, the stereoscopic display monitor performs a stereoscopic display by a shutter method, and shutter glasses are used as stereoscopic glasses worn by an observer who observes the monitor. The stereoscopic display monitor alternately outputs a two-parallax image in the monitor. For example, the monitor illustrated in FIG. 2A alternately outputs a left-eye image and a right-eye image with 120 Hz. As illustrated in FIG. 2A, the monitor includes an infrared-ray output unit, and controls an output of an infrared ray according to a timing at which images are switched.

The infrared ray output from the infrared-ray output unit is received by an infrared-ray receiving unit of the shutter glasses illustrated in FIG. 2A. A shutter is mounted to each of right and left frames of the shutter glasses, and the shutter glasses alternately switch a transmission state and a light shielding state of the right and left shutters according to a timing at which the infrared-ray receiving unit receives the infrared ray. A switching process of a transmission state and a light shielding state of the shutter will be described below.

As illustrated in FIG. 2B, each shutter includes an incident side polarizing plate and an output side polarizing plate, and further includes a liquid crystal layer disposed between the incident side polarizing plate and the output side polarizing plate. The incident side polarizing plate and the output side polarizing plate are orthogonal to each other as illustrated in FIG. 2B. Here, as illustrated in FIG. 2B, in an OFF state in which a voltage is not applied, light has passed through the incident side polarizing plate rotates at 90° due to an operation of the liquid crystal layer, and passes through the output side polarizing plate. In other words, the shutter to which a voltage is not applied becomes a transmission state.

Meanwhile, as illustrated in FIG. 2B, in an ON state in which a voltage is applied, a polarization rotation operation caused by liquid crystal molecules of the liquid crystal layer does not work, and thus light having passed through the incident side polarizing plate is shielded by the output side polarizing plate. In other words, the shutter to which a voltage is applied becomes a light shielding state.

In this regard, for example, the infrared-ray output unit outputs the infrared ray during a time period in which the left-eye image is being displayed on the monitor. Then, during a time period in which the infrared ray is being received, the infrared-ray receiving unit applies a voltage to the right-eye shutter without applying a voltage to the left-eye shutter. Through this operation, as illustrated in FIG. 2A, the right-eye shutter becomes the light shielding state, and the left-eye shutter becomes the transmission state, so that the left-eye image is incident to the left eye of the observer. Meanwhile, during a time period in which the right-eye image is being displayed on the monitor, the infrared-ray output unit stops an output of the infrared ray. Then, during a time period in which the infrared ray is not being received, the infrared-ray receiving unit applies a voltage to the left-eye shutter without applying a voltage to the right-eye shutter. Through this operation, the left-eye shutter becomes the light shielding state, and the right-eye shutter becomes the transmission state, so that the right-eye image is incident to the right eye of the observer. As described above, the stereoscopic display monitor illustrated in FIGS. 2A and 2B causes an image stereoscopically viewable to the observer to be displayed by switching an image to be displayed on the monitor in conjunction with the state of the shutter. A monitor employing a polarizing glasses method other than the shutter method is also known as the stereoscopic display monitor that allows a two-parallax image to be stereoscopically viewed.

Further, a stereoscopic display monitor that allows an observer to stereoscopically view a multi-parallax image with the naked eyes such as a nine-parallax image using a light beam controller such as a lenticular lens has been recently put to practical. This kind of stereoscopic display monitor makes a stereoscopic view possible by binocular parallax, and further makes a stereoscopic view possible by kinematic parallax in which an observed video changes with the movement of a point of view of an observer.

Figure 3:
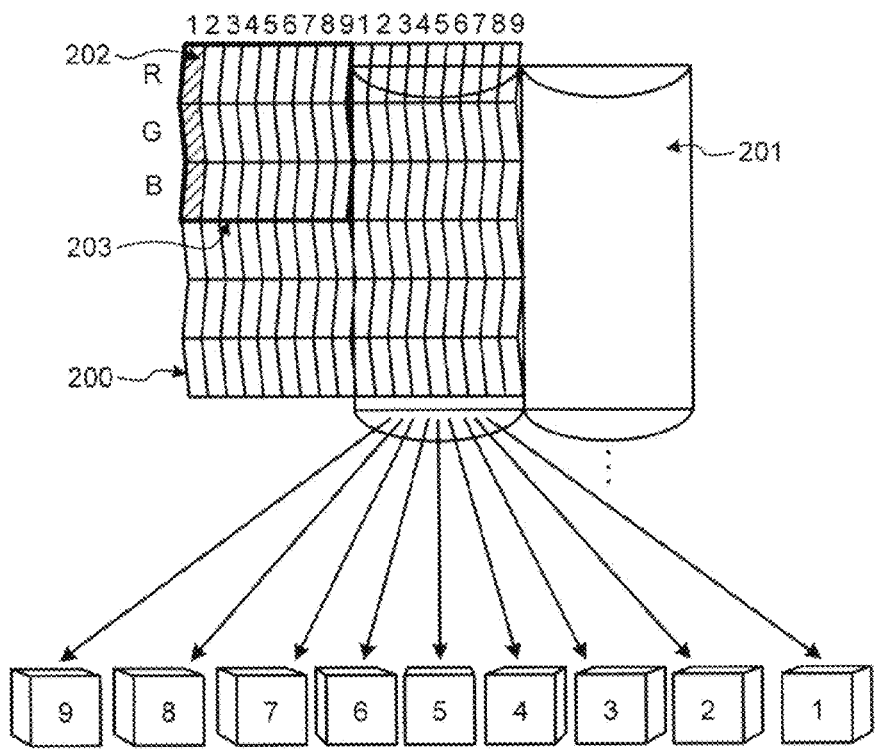
FIG. 3 is a drawing for explaining an example of a stereoscopic display monitor that realizes a stereoscopic display by using nine-eye parallax images.

FIG. 3 is a schematic for explaining an example of a stereoscopic display monitor that performs stereoscopic display using nine-parallax images. In the stereoscopic display monitor illustrated in FIG. 3, a light beam controller is arranged in front of a planar display surface 200 such as a liquid crystal panel. For example, in the stereoscopic display monitor illustrated in FIG. 3, a vertical lenticular sheet 201 including an optical opening that extends in a vertical direction is attached to the front surface of the display surface 200 as the light beam controller.

As illustrated in FIG. 3, in the display surface 200, an aspect ratio is 3:1, and pixels 202 each of which includes three sub-pixels of red (R), green (G), and blue (B) arranged in a longitudinal direction are arranged in the form of a matrix. The stereoscopic display monitor illustrated in FIG. 3 converts a nine-parallax image including nine images into an interim image arranged in a predetermined format (for example, in a lattice form), and outputs the interim image to the display surface 200. In other words, the stereoscopic display monitor illustrated in FIG. 3 allocates nine pixels at the same position in the nine-parallax image to the pixels 202 of nine columns, respectively, and then performs an output. The pixels 202 of nine columns become a unit pixel group 203 to simultaneously display nine images having different point-of-view positions.

The nine-parallax image simultaneously output as the unit pixel group 203 in the display surface 200 is radiated as parallel light through a Light Emitting Diode (LED) backlight, and further radiated in multiple directions through the vertical lenticular sheet 201. As light of each pixel of the nine-parallax image is radiated in multiple directions, lights incident to the left eye and the right eye of the observer change in conjunction with the position (the position of the point of view) of the observer. In other words, depending on an angle at which the observer views, a parallax image incident to the right eye differs in a parallactic angle from a parallax image incident to the left eye. Through this operation, the observer can stereoscopically view a shooting target, for example, at each of nine positions illustrated in FIG. 3. For example, the observer can stereoscopically view, in a state in which the observer directly faces a shooting target, at the position of "5" illustrated in FIG. 3, and can stereoscopically view, in a state in which a direction of a shooting target is changed, at the positions other than "5" illustrated in FIG. 3. The stereoscopic display monitor illustrated in FIG. 3 is merely an example. The stereoscopic display monitor that displays the nine-parallax image may include a horizontal stripe liquid crystal of "RRR---, GGG---, and BBB---" as illustrated in FIG. 3 or may include a vertical stripe liquid crystal of "RGBRGB---." Further, the stereoscopic display monitor illustrated in FIG. 3 may be of a vertical lens type in which a lenticular sheet is vertical as illustrated in FIG. 3 or may be of an oblique lens type in which a lenticular sheet is oblique.

The configuration example of the image processing system 1 according to the first embodiment has been briefly described so far. An application of the image processing system 1 described above is not limited to a case in which the PACS is introduced. For example, the image processing system 1 is similarly applied even to a case in which an electronic chart system for managing an electronic chart with a medical image attached thereto is introduced. In this case, the image storage device 120 serves as a database for managing an electronic chart. Further, for example, the image processing system 1 is similarly applied even to a case in which a Hospital Information System (HIS) or Radiology Information System (RIS) is introduced. Further, the image processing system 1 is not limited to the above-described configuration example. A function or an assignment of each device may be appropriately changed according to an operation form.

Figure 4:
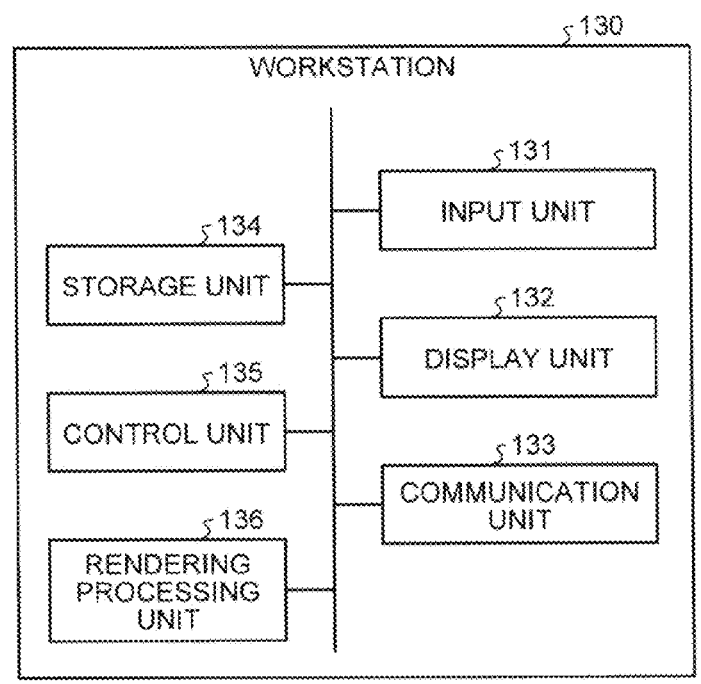
FIG. 4 is a drawing for explaining an exemplary configuration of a workstation according to the first embodiment.

Next, a configuration example of a workstation according to the first embodiment will be described with reference to FIG. 4. FIG. 4 is a diagram for explaining an exemplary configuration of a workstation according to the first embodiment. In the following, a "parallax image group" refers to an image group for a stereoscopic view generated by performing a volume rendering process on volume data. Further, a "parallax image" refers to each of images that configure the "parallax image group." In other words, the "parallax image group" is configured with a plurality of "parallax images" having different point-of-view positions.

The workstation 130 according to the first embodiment is a high-performance computer appropriate to image processing or the like, and includes an input unit 131, a display unit 132, a communication unit 133, a storage unit 134, a control unit 135, and a rendering processing unit 136 as illustrated in FIG. 4. In the following, a description will be made in connection with an example in which the workstation 130 is a high-performance computer appropriate to image processing or the like. However, the workstation 130 is not limited to this example, and may be an arbitrary information processing device. For example, the workstation 130 may be an arbitrary personal computer.

The input unit 131 includes a mouse, a keyboard, a trackball, or the like, and receives various operations which an operator has input on the workstation 130. Specifically, the input unit 131 according to the first embodiment receives an input of information used to acquire volume data which is a target of the rendering process from the image storage device 120. For example, the input unit 131 receives an input of the patient ID, the inspection ID, the apparatus ID, the series ID, or the like. Further, the input unit 131 according to the first embodiment receives an input of a condition (hereinafter, referred to as a "rendering condition") related to the rendering process.

The display unit 132 includes a liquid crystal panel serving as a stereoscopic display monitor, and displays a variety of information. Specifically, the display unit 132 according to the first embodiment displays a Graphical User Interface (GUI), which is used to receive various operations from the operator, a parallax image group, or the like. The communication unit 133 includes a Network Interface Card (NIC) or the like and performs communication with other devices.

The storage unit 134 includes a hard disk, a semiconductor memory device, or the like, and stores a variety of information. Specifically, the storage unit 134 according to the first embodiment stores the volume data acquired from the image storage device 120 through the communication unit 133. Further, the storage unit 134 according to the first embodiment stores therein volume data on which the rendering process is currently being performed, the groups of parallax images generated as a result of the rendering process, images for realizing a two-dimensional display, and the like.

The control unit 135 includes an electronic circuit such as a Central Processing Unit (CPU), a Micro Processing Unit (MPU), or a Graphics Processing Unit (GPU) or an integrated circuit such as an Application Specific Integrated Circuit (ASIC) or a Field Programmable Gate Array (FPGA). The control unit 135 controls the workstation 130 in general.

For example, the control unit 135 according to the first embodiment controls a display of the GUI on the display unit 132 or a display of a parallax image group. Further, for example, the control unit 135 controls transmission/reception of the volume data or the parallax image group to/from the image storage device 120, which is performed through the communication unit 133. Further, for example, the control unit 135 controls the rendering process performed by the rendering processing unit 136. Further, for example, the control unit 135 controls an operation of reading volume data from the storage unit 134 or an operation of storing a parallax image group in the storage unit 134.

In the first embodiment, the control unit 135 of the workstation 130 controls the rendering processing performed by the rendering processing unit 136, and cooperates with the rendering processing unit 136. Thus, the control unit 135 generates parallax images of different parallax positions alternately between continuous time-phase data and displays the parallax images on the display unit 132. This operation will be described later in detail.

The rendering processing unit 136 performs various rendering processes on volume data acquired from the image storage device 120 under control of the control unit 135, and thus generates a parallax image group. Specifically, the rendering processing unit 136 according to the first embodiment reads volume data from the storage unit 134, and first performs pre-processing on the volume data. Next, the rendering processing unit 136 performs a volume rendering process on the pre-processed volume data, and generates a parallax image group. Subsequently, the rendering processing unit 136 generates a 2D image in which a variety of information (a scale, a patient name, an inspection item, and the like) is represented, and generates a 2D output image by superimposing the 2D image on each parallax image group. Then, the rendering processing unit 136 stores the generated parallax image group or the 2D output image in the storage unit 134. Further, in the first embodiment, the rendering process refers to the entire image processing performed on the volume data, and the volume rendering process a process of generating a 2D image in which 3D information is reflected during the rendering process. For example, the medical image generated by the rendering process corresponds to a parallax image.

Figure 5:
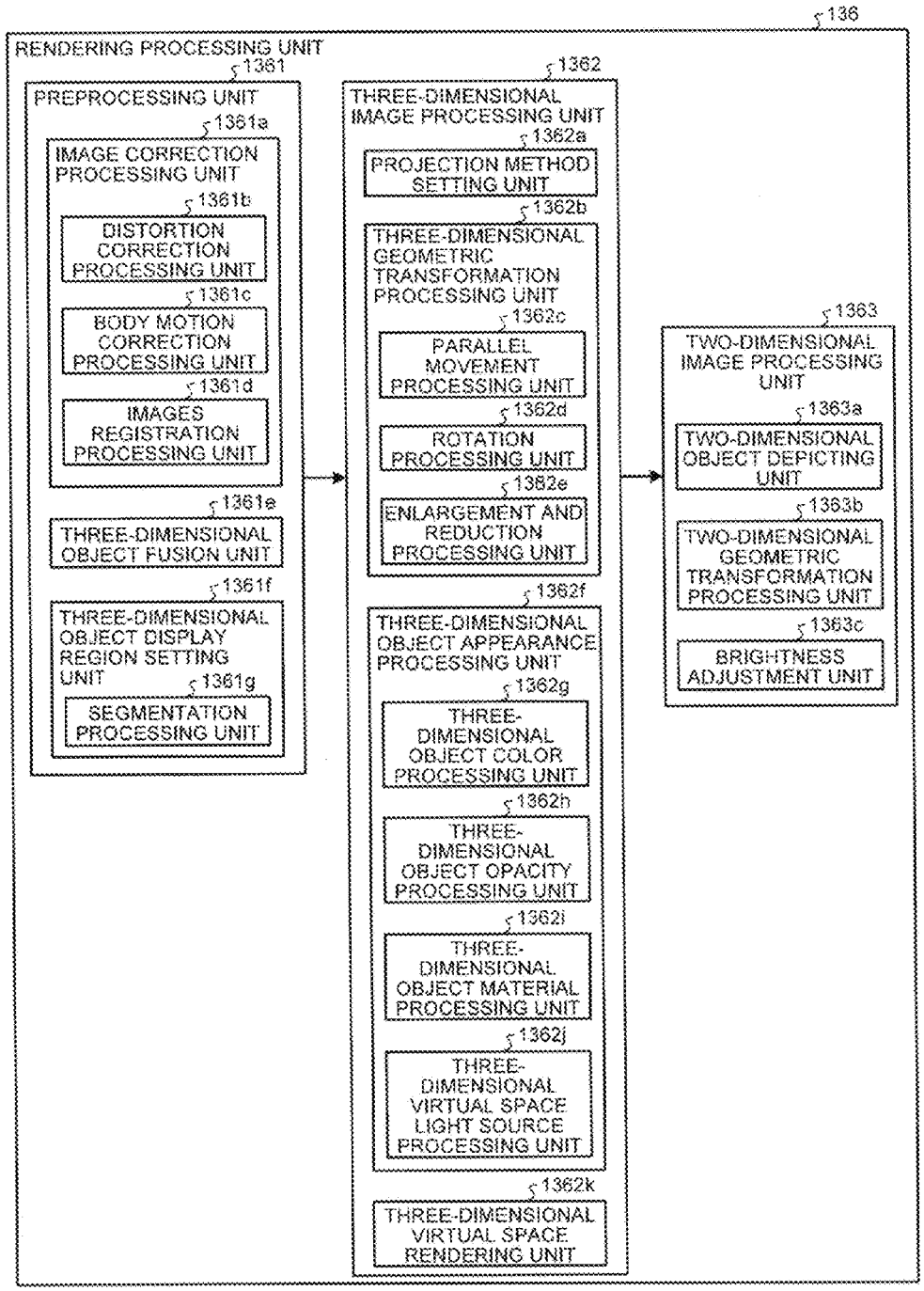
FIG. 5 is a drawing for explaining an exemplary configuration of a rendering processing unit shown in FIG. 4.

FIG. 5 is a diagram for explaining an exemplary configuration of a rendering processing unit illustrated in FIG. 4. As illustrated in FIG. 5, the rendering processing unit 136 includes a pre-processing unit 1361, a 3D image processing unit 1362, and a 2D image processing unit 1363. The pre-processing unit 1361 performs pre-processing on volume data. The 3D image processing unit 1362 generates a parallax image group from pre-processed volume data. The 2D image processing unit 1363 generates a 2D output image in which a variety of information is superimposed on a parallax image group. The respective units will be described below in order.

The pre-processing unit 1361 is a processing unit that performs a variety of pre-processing when performing the rendering process on volume data, and includes an image correction processing unit 1361a, a 3D object fusion unit 1361e, and a 3D object display region setting unit 1361f.

The image correction processing unit 1361a is a processing unit that performs an image correction process when processing two types of volume data as one volume data, and includes a distortion correction processing unit 1361b, a body motion correction processing unit 1361c, and an images registration processing unit 1361d as illustrated in FIG. 5. For example, the image correction processing unit 1361a performs an image correction process when processing volume data of a PET image generated by a PET-CT apparatus and volume data of an X-ray CT image as one volume data. Alternatively, the image correction processing unit 1361a performs an image correction process when processing volume data of a T1-weighted image and volume data of a T2-weighted image which are generated by an MRI apparatus as one volume data.

Further, the distortion correction processing unit 1361b corrects distortion of individual volume data caused by a collection condition at the time of data collection by the medical image diagnosis apparatus 110. Further, the body motion correction processing unit 1361c corrects movement caused by body motion of a subject during a data collection time period used to generate individual volume data. Further, the images registration processing unit 1361d performs positioning (registration), for example, using a cross correlation method between two pieces of volume data which have been subjected to the correction processes by the distortion correction processing unit 1361b and the body motion correction processing unit 1361c.

The 3D object fusion unit 1361e performs the fusion of a plurality of volume data which have been subjected to the positioning by the images registration processing unit 1361d. Further, the processes performed by the image correction processing unit 1361a and the 3D object fusion unit 1361e may not be performed when the rendering process is performed on single volume data.

The 3D object display region setting unit 1361f is a processing unit that sets a display area corresponding to a display target organ designated by an operator, and includes a segmentation processing unit 1361g. The segmentation processing unit 1361g is a processing unit that extracts an organ, such as a heart, a lung, or a blood vessel, which is designated by the operator, for example, by an area extension technique based on a pixel value (voxel value) of volume data.

Further, the segmentation processing unit 1361g does not perform the segmentation process when a display target organ has not been designated by the operator. Further, the segmentation processing unit 1361g extracts a plurality of corresponding organs when a plurality of display target organs is designated by the operator. Further, the process performed by the segmentation processing unit 1361g may be re-executed at a fine adjustment request of the operator who has referred to a rendering image.

The 3D image processing unit 1362 performs the volume rendering process on the pre-processed volume data which has been subjected to the process performed by the pre-processing unit 1361. As processing units for performing the volume rendering process, the 3D image processing unit 1362 includes a projection method setting unit 1362a, a 3D geometric transformation processing unit 1362b, a 3D object appearance processing unit 1362f, and a 3D virtual space rendering unit 1362k.

The projection method setting unit 1362a determines a projection method for generating a parallax image group. For example, the projection method setting unit 1362a determines whether the volume rendering process is to be executed using a parallel projection method or a perspective projection method.

The 3D geometric transformation processing unit 1362b is a processing unit that determines information necessary to perform 3D geometric transform on volume data which is to be subjected to the volume rendering process, and includes a parallel movement processing unit 1362c, a rotation processing unit 1362d, and a enlargement and reduction processing unit 1362e. The parallel movement processing unit 1362c is a processing unit that determines a shift amount to shift volume data in parallel when a point-of-view position is shifted in parallel at the time of the volume rendering process. The rotation processing unit 1362d is a processing unit that determines a movement amount for rotationally moving volume data when a point-of-view position is rotationally moved at the time of the volume rendering process. Further, the enlargement and reduction processing unit 1362e is a processing unit that determines an enlargement ratio or a reduction ratio of volume data when it is requested to enlarge or reduce a parallax image group.

The 3D object appearance processing unit 1362f includes a 3D object color processing unit 1362g, a 3D object opacity processing unit 1362h, a 3D object material processing unit 1362i, and a 3D virtual space light source processing unit 1362j. The 3D object appearance processing unit 1362f performs a process of determining a display form of a parallax image group to be displayed through the above processing units, for example, according to the operator's request.

The 3D object color processing unit 1362g is a processing unit that determines a color colored to each area segmented from volume data. The 3D object opacity processing unit 1362h is a processing unit that determines opacity of each voxel configuring each area segmented from volume data. In volume data, an area behind an area having opacity of "100%" is not represented in a parallax image group. Further, in volume data, an area having opacity of "0%" is not represented in a parallax image group.

The 3D object material processing unit 1362i is a processing unit that determines the quality of a material of each area segmented from volume data and adjusts the texture when the area is represented. The 3D virtual space light source processing unit 1362j is a processing unit that determines the position or the type of a virtual light source installed in a 3D virtual space when the volume rendering process is performed on volume data. Examples of the type of a virtual light source include a light source that emits a parallel beam from infinity and a light source that emits a radial beam from a point of view.

The 3D virtual space rendering unit 1362k performs the volume rendering process on volume data, and generates a parallax image group. Further, the 3D virtual space rendering unit 1362k uses a variety of information, which is determined by the projection method setting unit 1362a, the 3D geometric transformation processing unit 1362b, and the 3D object appearance processing unit 1362f, as necessary when the volume rendering process is performed.

Here, the volume rendering process performed by the 3D virtual space rendering unit 1362k is performed according to the rendering condition. For example, the parallel projection method or the perspective projection method may be used as the rendering condition. Further, for example, a reference point-of-view position, a parallactic angle, and a parallax number may be used as the rendering condition. Further, for example, a parallel shift of a point-of-view position, a rotational movement of a point-of-view position, an enlargement of a parallax image group, and a reduction of a parallax image group may be used as the rendering condition. Further, for example, a color colored, transparency, the texture, the position of a virtual light source, and the type of virtual light source may be used as the rendering condition. The rendering condition may be input by the operator through the input unit 131 or may be initially set. In either case, the 3D virtual space rendering unit 1362k receives the rendering condition from the control unit 135, and performs the volume rendering process on volume data according to the rendering condition. Further, at this time, the projection method setting unit 1362a, the 3D geometric transformation processing unit 1362b, and the 3D object appearance processing unit 1362f determine a variety of necessary information according to the rendering condition, and thus the 3D virtual space rendering unit 1362k generates a parallax image group using a variety of information determined.

Figure 6:
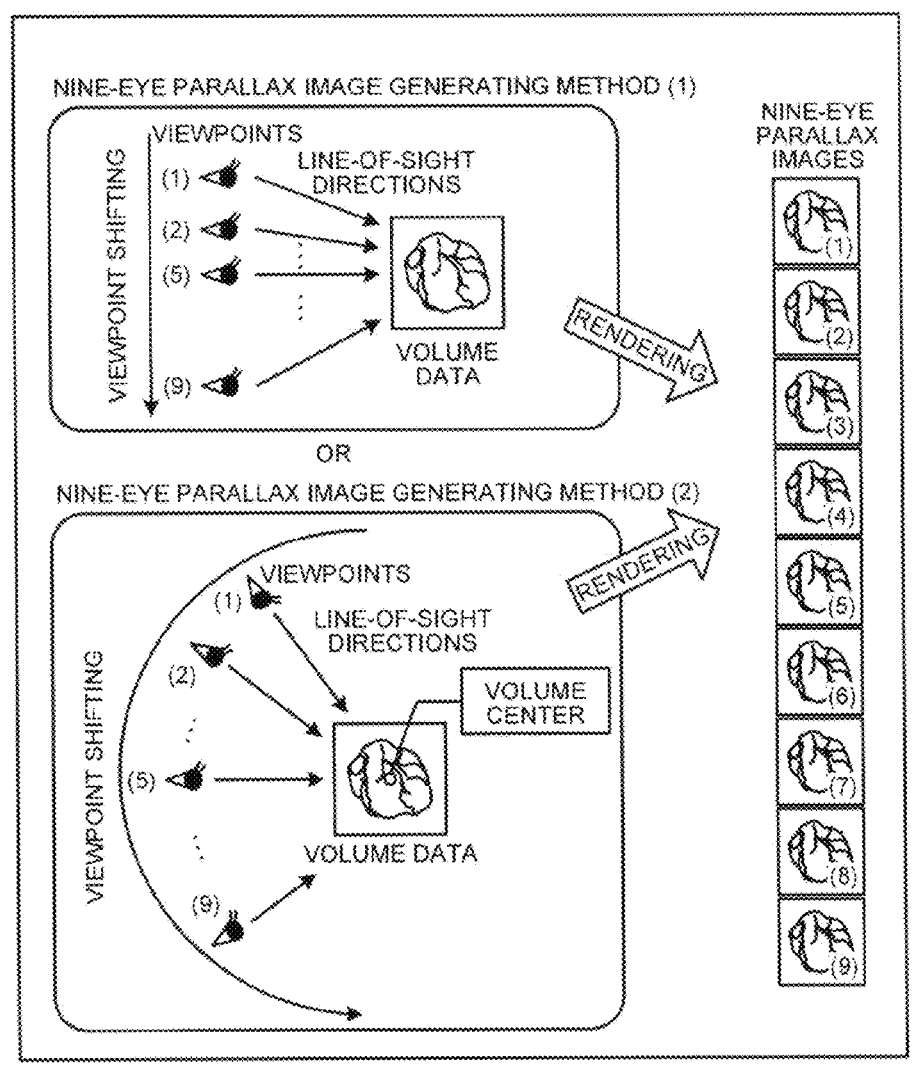
FIG. 6 is a drawing for explaining an example of a volume rendering process according to the first embodiment.

FIG. 6 is a schematic for explaining an example of volume rendering processing according to the first embodiment. For example, let us assume that the 3D virtual space rendering unit 1362k receives the parallel projection method as the rendering condition, and further receives a reference point-of-view position (5) and a parallactic angle "1" as illustrated in a "nine-parallax image generating method (1)" of FIG. 6. In this case, the 3D virtual space rendering unit 1362k shifts the position of a point of view to (1) to (9) in parallel so that the parallactic angle can be changed by "1", and generates nine parallax images between which the parallactic angle (an angle in a line-of-sight direction) differs from each other by 1° by the parallel projection method. Further, when the parallel projection method is performed, the 3D virtual space rendering unit 1362k sets a light source that emits a parallel beam in a line-of-sight direction from infinity.

Alternatively, the 3D virtual space rendering unit 1362k receives the perspective projection method as the rendering condition, and further receives a reference point-of-view position (5) and a parallactic angle "1" as illustrated in a "nine-parallax image generating method (2)" of FIG. 6. In this case, the 3D virtual space rendering unit 1362k rotationally moves the position of a point of view to (1) to (9) so that the parallactic angle can be changed by "1" centering on the center (gravity center) of volume data, and generates nine parallax images between which the parallactic angle differs from each other by 1° by the perspective projection method. Further, when the perspective projection method is performed, the 3D virtual space rendering unit 1362k sets a point light source or a surface light source, which three-dimensionally emits light in a radial manner centering on a line-of-sight direction, at each point of view. Further, when the perspective projection method is performed, the points of view (1) to (9) may be parallel-shifted according to the rendering condition.

Further, the 3D virtual space rendering unit 1362k may perform the volume rendering process using the parallel projection method and the perspective projection method together by setting a light source that two-dimensionally emits light in a radial manner centering on the line-of-sight direction on a longitudinal direction of a volume rendering image to display, and emits a parallel beam in the line-of-sight direction from infinity on a transverse direction of a volume rendering image to display.

The nine parallax images generated in the above-described way configure a parallax image group. In the first embodiment, for example, the nine parallax images are converted into interim images arranged in a predetermined format (for example, a lattice form) by the control unit 135, and then output to the display unit 132 serving as the stereoscopic display monitor. At this time, the operator of the workstation 130 can perform an operation of generating a parallax image group while checking a stereoscopically viewable medical image displayed on the stereoscopic display monitor.

The example of FIG. 6 has been described in connection with the case in which the projection method, the reference point-of-view position, and the parallactic angle are received as the rendering condition. However, similarly even when any other condition is received as the rendering condition, the 3D virtual space rendering unit 1362k generates the parallax image group while reflecting each rendering condition.

Further, the 3D virtual space rendering unit 1362k not only performs the volume rendering process, but also reconstructs a planar image on an arbitrary plane (e.g., an axial plane, a sagittal plane, or a coronal plane). For example, the 3D virtual space rendering unit 1362k reconstructs a Multi Planar Reconstruction (MPR) image from the volume data by implementing an MPR method. In addition, the 3D virtual space rendering unit 1362k also has a function of performing a "curved MPR" and a function of performing an "intensity projection".

Subsequently, the parallax image group which the 3D image processing unit 1362 has generated based on the volume data is regarded as an underlay. Then, an overlay in which a variety of information (a scale, a patient name, an inspection item, and the like) is represented is superimposed on the underlay, so that a 2D output image is generated. The 2D image processing unit 1363 is a processing unit that performs image processing on the overlay and the underlay and generates a 2D output image, and includes a 2D object depicting unit 1363a, a 2D geometric transformation processing unit 1363b, and a brightness adjustment unit 1363c as illustrated in FIG. 5. For example, in order to reduce a load required in a process of generating a 2D output image, the 2D image processing unit 1363 generates nine 2D output images by superimposing one overlay on each of nine parallax images (underlays). In the following, an underlay on which an overlay is superimposed may be referred to simply as a "parallax image."

The 2D object depicting unit 1363a is a processing unit that renders a variety of information represented on the overlay. The 2D geometric transformation processing unit 1363b is a processing unit that parallel-shifts or rotationally moves the position of a variety of information represented on the overlay, or enlarges or reduces a variety of information represented on the overlay.

The brightness adjustment unit 1363c is a processing unit that performs a brightness converting process. For example, the brightness adjustment unit 1363c adjusts brightness of the overlay and the underlay according to an image processing parameter such as gradation of a stereoscopic display monitor of an output destination, a window width (WW), or a window level (WL).

The two-dimensional images to be output that are generated in this manner are temporarily stored in the storage unit 134 by the control unit 135, for example, and are transmitted to the image storage device 120 via the communication unit 133. If the terminal device 140 acquires the two-dimensional images to be output from the image storage device 120, converts the two-dimensional images into an intermediate image in which the two-dimensional images are arranged in a predetermined format (for example, a lattice form), and displays the intermediate image on the stereoscopic display monitor, for example, the doctor or the laboratory technician who is the observer can browse the medical image capable of being viewed stereoscopically with the various types of information (e.g., a scale, a patient name, and an examination item) depicted thereon.

The exemplary configurations of the image processing system 1 and the workstation 130 according to the first embodiment have thus been explained. With the configurations as described above, the workstation 130 according to the first embodiment is configured to be able to have three-dimensional information easily understood even when chronological image data is displayed, as a result of processes performed by the control unit 135, which is explained in detail below. More specifically, the workstation 130 according to the first embodiment is configured to, when displaying chronological three-dimensional image data (hereinafter "4D data") on the display unit 132 capable of providing a stereoscopic view, display images obtained by combining other images with images used as a reference among the 4D data.

Figure 7:
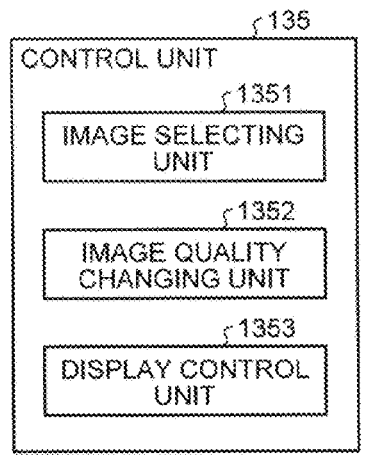
FIG. 7 is a drawing for explaining an exemplary configuration of a control unit according to the first embodiment.

FIG. 7 is a drawing for explaining an exemplary configuration of the control unit 135 according to the first embodiment. As shown in FIG. 7, the control unit 135 includes an image selecting unit 1351, an image quality changing unit 1352, and a display control unit 1353 and is configured to cause the 4D data to be displayed in such a manner that the operator is able to easily understand the three-dimensional information.

Figure 8:
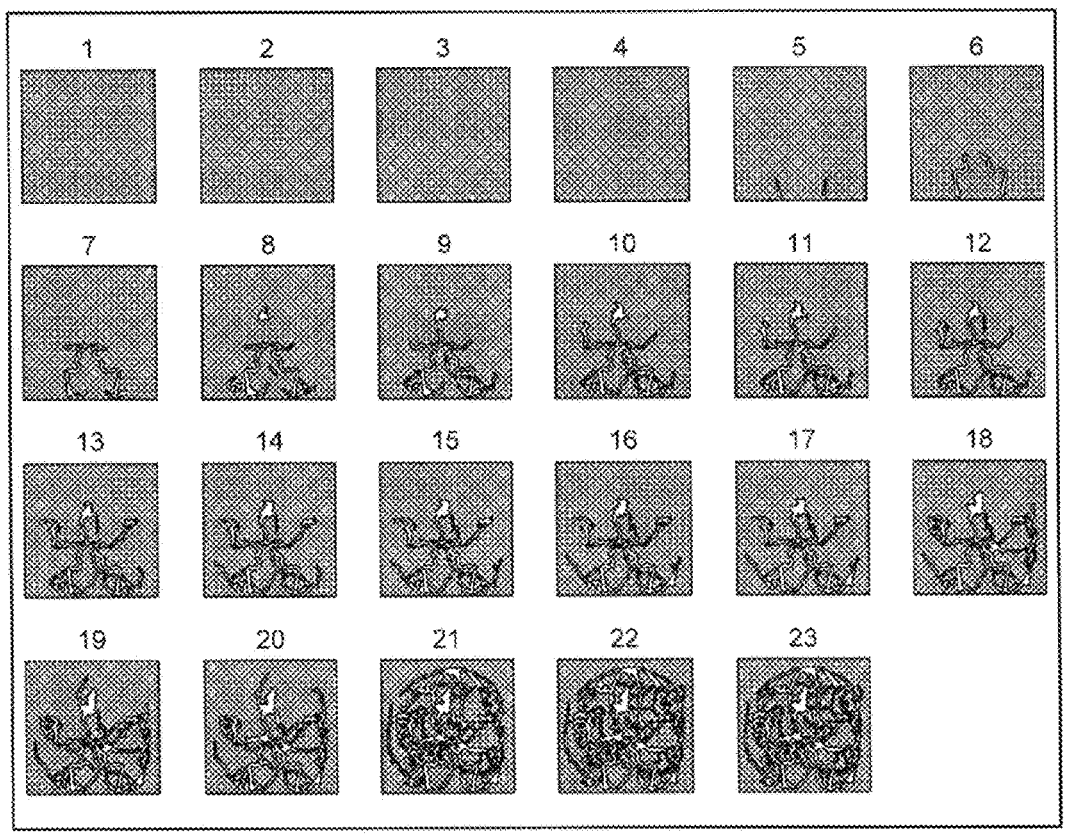
FIG. 8 is a drawing of 4D data according to the first embodiment.

In the following sections, an example will be explained first in which it is difficult for the operator to understand the three-dimensional information, when the 4D data is displayed on a display unit having a stereoscopic function. FIG. 8 is a drawing of the 4D data according to the first embodiment. The 4D data shown in FIG. 8 indicates the state of blood vessels rendered by a contrast agent, with image data in twenty-three frames. As observed from FIG. 8, in the 4D data shown in FIG. 8, the blood vessels start being rendered by the image data in the fifth frame, and more and more blood vessels are gradually rendered as the contrast agent flows. When such 4D data is used, it is difficult for the operator to perceive the three-dimensional effect of the entirety of the blood vessels, because some of the blood vessels into which the contrast agent has flowed start being rendered all of sudden, and then disappear. To cope with this situation, the control unit 135 according to the first embodiment is configured to display images with which the operator is able to easily perceive the three-dimensional effect, even when such 4D data is displayed.

Returning to the description of FIG. 7, the image selecting unit 1351 selects a group of reference parallax images to be used as a reference, from among a plurality of groups of parallax images generated from image data taken chronologically. More specifically, from among the plurality of groups of parallax images, the image selecting unit 1351 selects, as the group of reference parallax images, a group of parallax images having the highest ratio calculated as a ratio of the area in which the display target object is rendered to the entire area of each image. In other words, the image selecting unit 1351 selects, as the group of reference parallax images, the image data rendering the display target object in a manner closest to showing a whole picture thereof, from among the plurality of pieces of image data contained in the 4D data.

For example, the image selecting unit 1351 selects the group of reference parallax images, based on the brightness level of each of the pieces of image data that correspond to different time phases and are contained in the 4D data. In one example, the image selecting unit 1351 calculates a total value of brightness levels of the pixels in each of the pieces of image data corresponding to the twenty-three frames shown in FIG. 8 and selects the image data for the twenty-third frame of which the calculated total value is largest, as the group of reference parallax images.

The image quality changing unit 1352 changes an image quality of at least one selected from between the group of reference parallax images selected by the image selecting unit 1351 and a group of parallax images contained in the plurality of groups of parallax images. More specifically, the image quality changing unit 1352 changes at least one selected from opacity, contrast, and lightness of the group of reference parallax images or the parallax images contained in the plurality of groups of parallax images.

FIG. 9 is a drawing for explaining an example of a process performed by the image quality changing unit 1352 according to the first embodiment. FIG. 9 illustrates a situation in which, from among the pieces of 4D data corresponding to the twenty-three frames shown in FIG. 8, the image selecting unit 1351 selects the image data corresponding to the twenty-third frame as the group of reference parallax images, and a process is performed on the selected group of reference parallax images. For example, as shown in FIG. 9(B), the image quality changing unit 1352 changes the image quality of the group of reference parallax images by raising the opacity level of the group of reference parallax images shown in FIG. 9(A).

Returning to the description of FIG. 7, the display control unit 1353 causes images to be displayed that are formed by combining a group of parallax images contained in the plurality of groups of parallax images with the group of reference parallax images of which the image quality was changed by the image quality changing unit 1352, or by combining the group of reference parallax images selected by the image selecting unit 1351 with the group of parallax images of which the image quality was changed by the image quality changing unit 1352, or by combining together the group of reference parallax images and the group of parallax images contained in the plurality of groups of parallax images of which the image qualities were changed by the image quality changing unit 1352. More specifically, the display control unit 1353 causes superimposed images to be displayed that are obtained by superimposing a group of parallax images contained in the plurality of groups of parallax images onto the group of reference parallax images.

Figure 10:
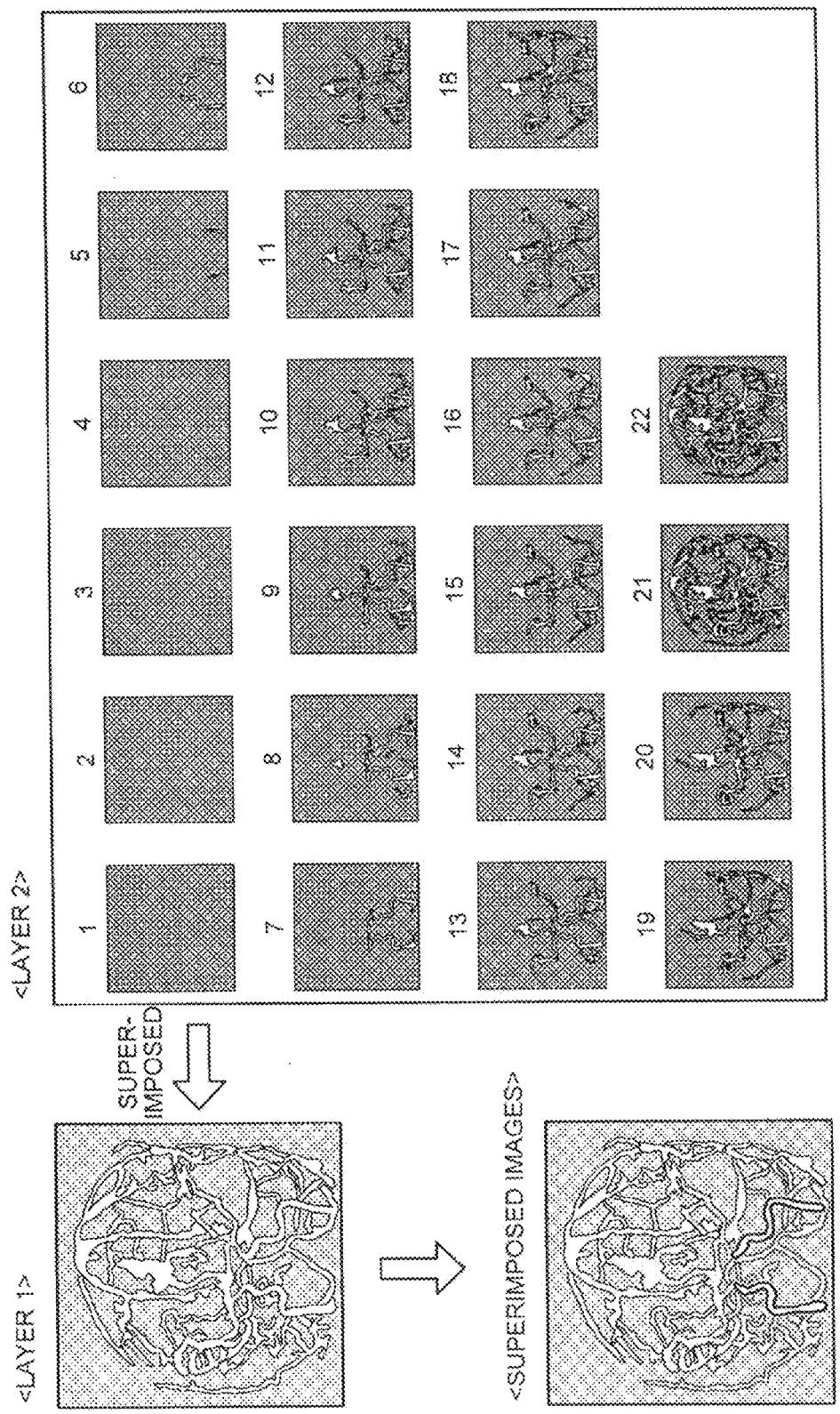
FIG. 10 is a drawing for explaining an example of a process performed by a display control unit according to the first embodiment.

FIG. 10 is a drawing for explaining an example of a process performed by the display control unit 1353 according to the first embodiment. For example, as shown in FIG. 10, the display control unit 1353 causes the group of reference parallax images of which the opacity level was raised by the image quality changing unit 1352 to be displayed in layer 1 and causes the groups of parallax images that correspond to twenty-two frames and are contained in the 4D data to be chronologically displayed in layer 2. In other words, the display control unit 1353 causes the superimposed images to be displayed that are obtained by superimposing the group of parallax images corresponding to the first frame onto the group of reference parallax images and subsequently causes the superimposed images to be displayed that are obtained by superimposing the group of parallax images corresponding to the second frame onto the group of reference parallax images. Further, the display control unit 1353 causes the superimposed images obtained by superimposing the group of parallax images corresponding to each of the frames onto the group of reference parallax images to be sequentially displayed on the display unit 132. For example, as shown with the caption "<SUPERIMPOSED IMAGES>" in FIG. 10, superimposed images obtained by superimposing the group of parallax images in the sixth frame onto the group of reference parallax images are displayed on the display unit 132.

By causing the 4D data to be displayed in this manner, the workstation 130 according to the first embodiment is able to display, for the operator, the manner in which the contrast agent is flowing, while constantly displaying the images in which the whole picture of the blood vessels are rendered in a three-dimensional manner.

Figure 11:
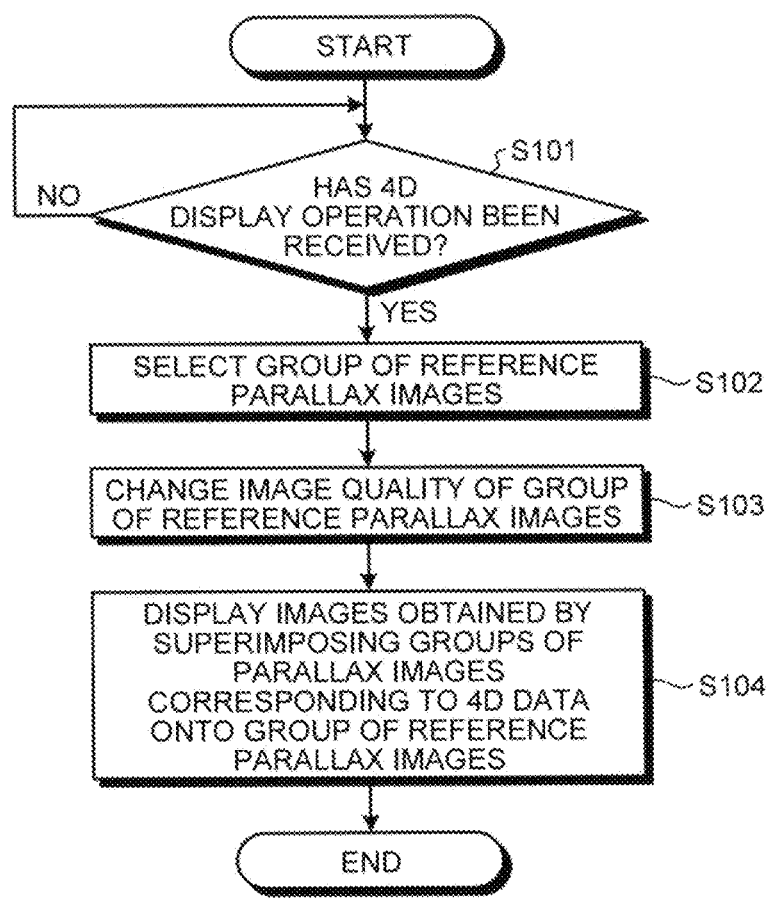
FIG. 11 is a flowchart of a procedure in a process performed by the workstation according to the first embodiment.

Next, a process performed by the workstation 130 according to the first embodiment will be explained, with reference to FIG. 11. FIG. 11 is a flowchart of a procedure in the process performed by the workstation 130 according to the first embodiment. As shown in FIG. 11, in the workstation 130 according to the first embodiment, when having received a display operation for 4D data from the operator via the input unit 131 (step S101: Yes), the image selecting unit 1351 selects a group of reference parallax images out of the 4D data for which the display operation was received (step S102).

After that, the image quality changing unit 1352 changes an image quality (opacity, contrast, lightness, or the like) of the group of reference parallax images selected by the image selecting unit 1351 (step S103). Subsequently, the display control unit 1353 causes superimposed images to be sequentially displayed that are obtained by superimposing the groups of parallax images corresponding to the 4D data onto the group of reference parallax images of which the image quality was changed by the image quality changing unit 1352 (step S104). It should be noted that the workstation 130 according to the first embodiment is in a standby state until a display operation for the 4D data is received (step S101: No).

As explained above, according to the first embodiment, the image selecting unit 1351 selects the group of reference parallax images to be used as a reference, from among the plurality of groups of parallax images generated from the image data taken chronologically. Further, the image quality changing unit 1352 changes the image quality of at least one selected from between the group of reference parallax images selected by the image selecting unit 1351 and the group of parallax images contained in the plurality of groups of parallax images. After that, the display control unit 1353 causes the images to be displayed that are formed by combining the group of parallax images contained in the plurality of groups of parallax images with the group of reference parallax images of which the image quality was changed by the image quality changing unit 1352, or by combining the group of reference parallax images selected by the image selecting unit 1351 with the group of parallax images of which the image quality was changed by the image quality changing unit 1352, or by combining together the group of reference parallax images and the group of parallax images contained in the plurality of groups of parallax images of which the image qualities were changed by the image quality changing unit 1352. As a result, the workstation 130 according to the first embodiment is able to display, for the operator, the chronological changes of the display target object, while constantly displaying the whole picture of the display target object in the three dimensional manner. It is therefore possible to have the three-dimensional information easily understood even when the chronological image data is displayed.

Further, according to the first embodiment, the image selecting unit 1351 selects, as the group of reference parallax images, the group of parallax images having the highest ratio calculated as the ratio of the area in which the display target object is rendered to the entire area of each image, from among the plurality of groups of parallax images. As a result, the workstation 130 according to the first embodiment is able to cause such images that render the entire picture of the display target object to the highest extent to be constantly displayed and thus makes it possible for the operator to more easily understand the three-dimensional information of the display target object.

Further, according to the first embodiment, the image quality changing unit 1352 changes at least one selected from the opacity, the contrast, and the lightness of the group of reference parallax images or the group of parallax images contained in the plurality of groups of parallax images. As a result, the workstation 130 according to the first embodiment is able to make clearer the difference between the group of reference parallax images and the groups of parallax images that correspond to the 4D data and are to be superimposed and thus makes it possible for the operator to accurately understand the chronological changes of the display target object.

Further, according to the first embodiment, the display control unit 1353 causes the superimposed images to be displayed that are obtained by superimposing the groups of parallax images contained in the plurality of groups of parallax images onto the group of reference parallax images. As a result, the workstation 130 according to the first embodiment makes it possible for the operator to view the 4D data with similar perceptive feelings to the ones experienced in conventional examples.

Second Embodiment

In the first embodiment described above, the example is explained in which only the superimposed images are displayed on the display unit 132. In a second embodiment, an example will be explained in which a group of parallax images corresponding to the 4D data, a group of reference parallax images, and superimposed images obtained by superimposing these images together are displayed on a single screen, in correspondence with changes of viewpoints of the operator. The control unit according to the second embodiment has the same configuration as that of the control unit 135 according to the first embodiment shown in FIG. 7. Thus, in the second embodiment, the control unit that exercises control so that the group of parallax images corresponding to the 4D data, the group of reference parallax images, and the superimposed images obtained by superimposing these images together are displayed on the single screen will be referred to as a display control unit 1353a. In other words, the display control unit 1353a is obtained by adding additional processes to the display control unit 1353 shown in FIG. 7.

Figure 12:
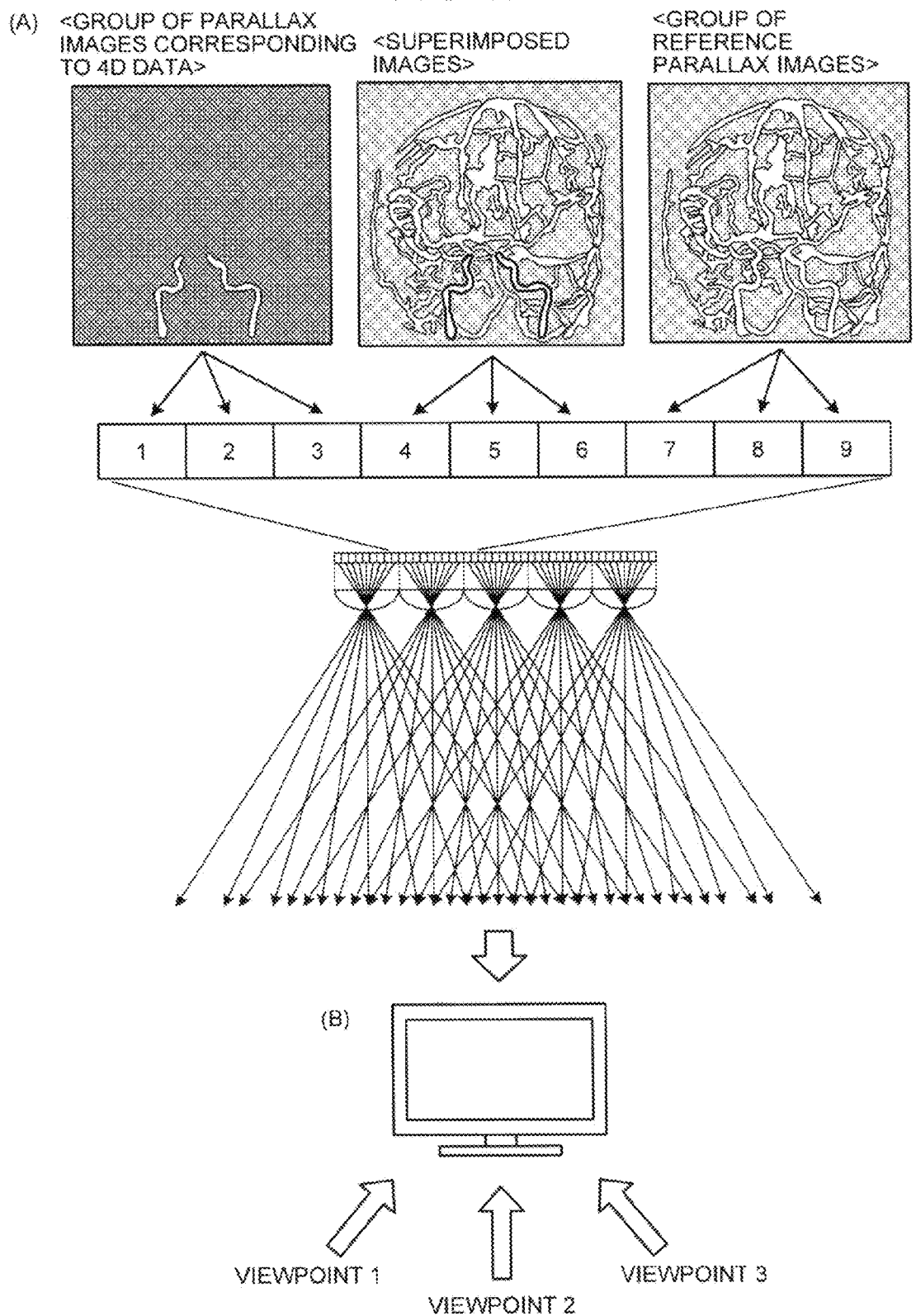
FIG. 12 is a drawing for explaining an example of a process performed by a display control unit according to a second embodiment.

The display control unit 1353a causes the group of reference parallax images, the superimposed images, and a group of parallax images contained in the plurality of groups of parallax images to be displayed at mutually-different angles with respect to the display surface of the display unit 132 having the stereoscopic function. More specifically, the display control unit 1353a causes the group of reference parallax images, the superimposed images, and the group of parallax images contained in the plurality of groups of parallax images to be each output to a predetermined number of pixels among nine columns of pixels provided in the display unit 132. FIG. 12 is a drawing for explaining an example of the process performed by the display control unit 1353a according to the second embodiment.

For example, as shown in FIG. 12(A), the display control unit 1353a causes the group of parallax images corresponding to the 4D data to be output to the pixels in the first to the third columns, which are among the nine columns of pixels. Further, as shown in FIG. 12(A), the display control unit 1353a causes the superimposed images to be output to the pixels in the fourth to the sixth columns, which are among the nine columns of pixels. Further, as shown in FIG. 12(A), the display control unit 1353a causes the group of reference parallax images to be output to the pixels in the seventh to the ninth columns, which are among the nine columns of pixels.

In other words, the display control unit 1353a causes the images corresponding to three parallaxes from among the parallax images corresponding to the different time phases in the 4D data to be sequentially output to the pixels in columns 1 to 3. Also, the display control unit 1353a causes the images corresponding to three parallaxes in the reference parallax images to be continuously output to the pixels in columns 7 to 9. Further, the display control unit 1353a causes superimposed images to be output to the pixels in columns 4 to 6 that are obtained by superimposing the group of parallax images that are currently output to the pixels in columns 1 to 3 onto the group of reference parallax images continuously output to the pixels in columns 7 to 9.

As a result, as shown in FIG. 12(B), the operator is able to view the group of parallax images corresponding to the 4D data at viewpoint 1, the superimposed images at viewpoint 2, and the group of reference parallax images at viewpoint 3.

Figure 13:
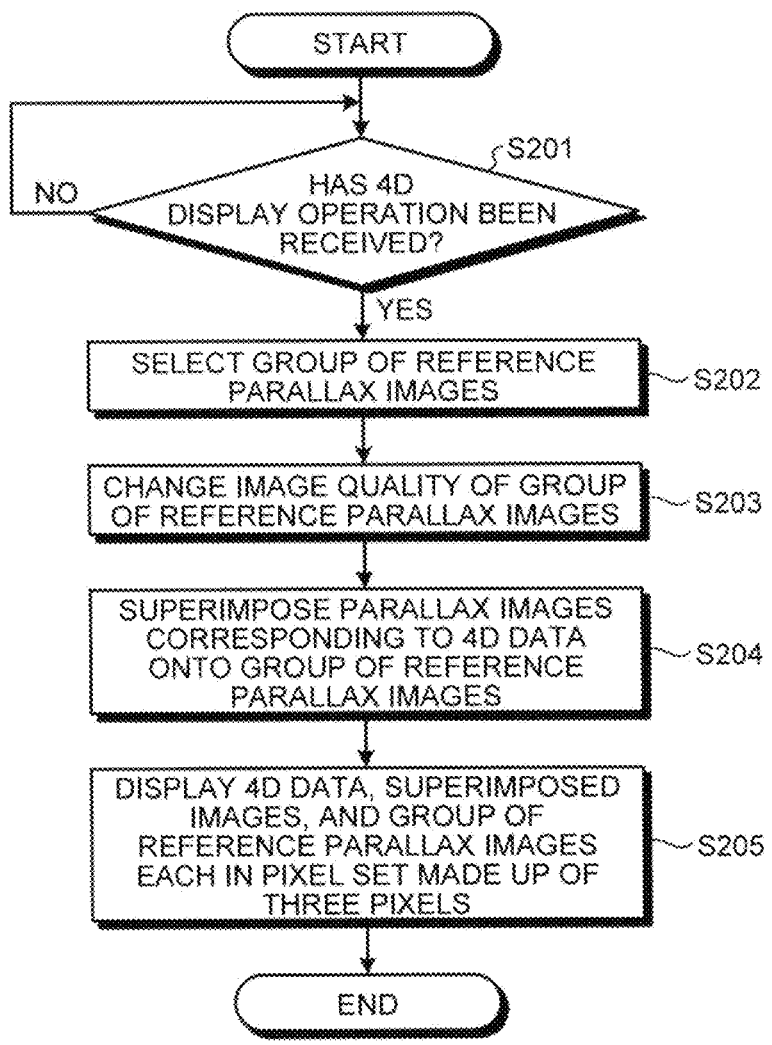
FIG. 13 is a flowchart of a procedure in a process performed by a workstation according to the second embodiment.

Next, a process performed by the workstation 130 according to the second embodiment will be explained, with reference to FIG. 13. FIG. 13 is a flowchart of a procedure in the process performed by the workstation 130 according to the second embodiment. As shown in FIG. 13, in the workstation 130 according to the second embodiment, when having received a display operation for 4D data from the operator via the input unit 131 (step S201: Yes), the image selecting unit 1351 selects a group of reference parallax images out of the 4D data for which the display operation was received (step S202).

After that, the image quality changing unit 1352 changes an image quality (opacity, contrast, lightness, or the like) of the group of reference parallax images selected by the image selecting unit 1351 (step S203). Subsequently, the display control unit 1353a superimposes the group of parallax images corresponding to the 4D data onto the group of reference parallax images of which the image quality was changed by the image quality changing unit 1352 (step S204). After that, the display control unit 1353a causes the group of parallax image corresponding to the 4D data, the superimposed images, and the group of reference parallax images to be each displayed in a pixel set made up of three pixels, which are among the nine columns of pixels (step S205). It should be noted that the workstation 130 according to the second embodiment is in a standby state until a display operation for the 4D data is received (step S201: No).

As explained above, according to the second embodiment, the display control unit 1353a causes the group of reference parallax images, the superimposed images, and the group of parallax images contained in the plurality of groups of parallax images to be displayed at the mutually-different angles with respect to the display surface of the display unit 132 having the stereoscopic function. As a result, by causing the superimposed group of reference parallax images and the superimposed group of parallax images corresponding to the 4D data to be displayed together with the superimposed images, the workstation 130 according to the second embodiment makes it possible for the operator to view the chronological changes in the 4D data rendering the whole picture of the display target object, while recognizing the very original images.

Third Embodiment

In the first and the second embodiments, the examples in which the superimposed images are displayed are explained. In a third embodiment, an example will be explained in which a group of reference parallax images and a group of parallax images corresponding to the 4D data are fused together, without generating superimposed images. In the third embodiment, the same configuration as that of the control unit 135 according to the first embodiment shown in FIG. 7 is used. Thus, in the third embodiment, the control unit that fuses together the group of reference parallax images and the group of parallax images corresponding to the 4D data, without generating superimposed images, will be referred to as a display control unit 1353b. In other words, the display control unit 1353b is obtained by adding additional processes to the display control unit 1353 shown in FIG. 7.

Figure 14:
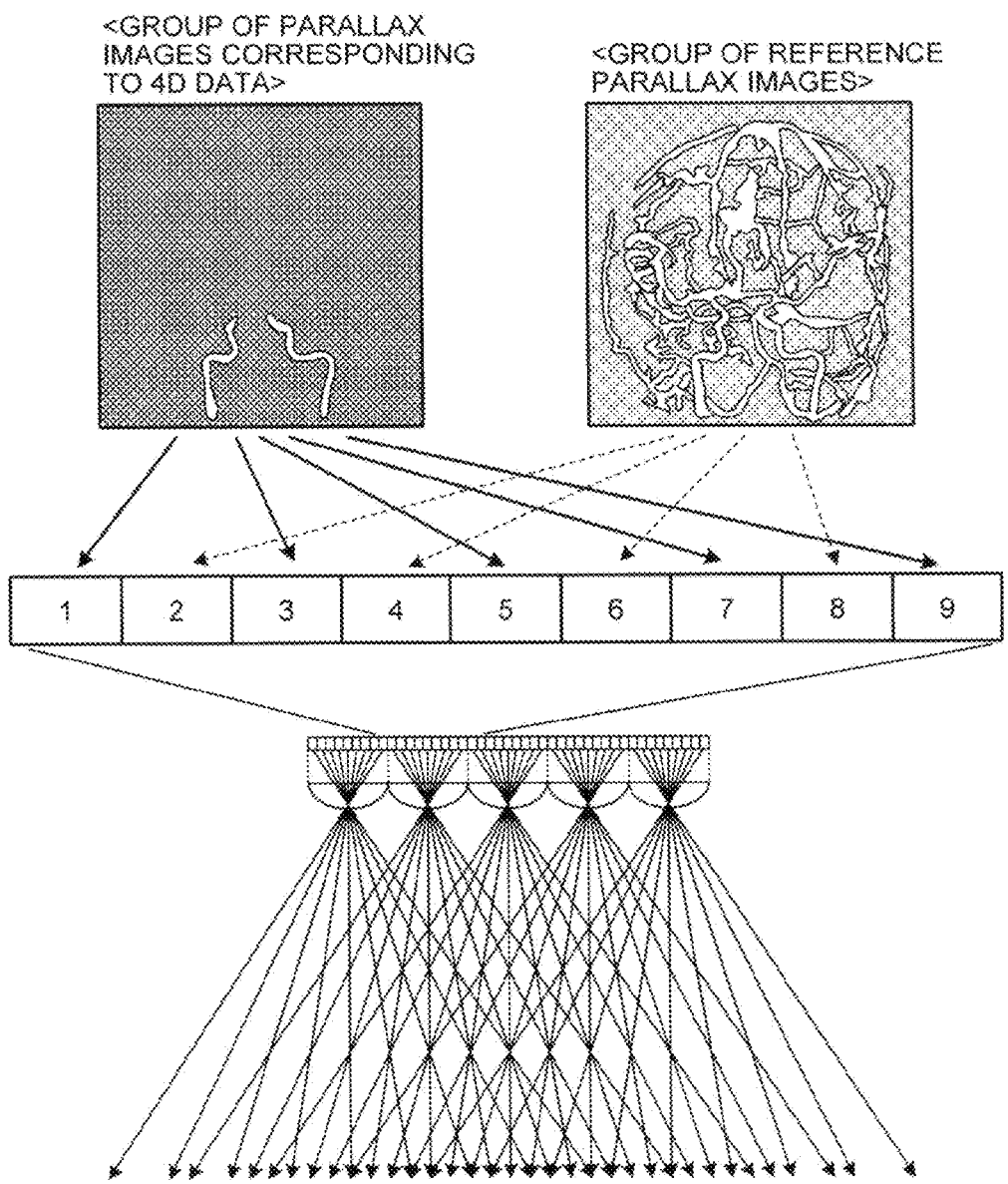
FIG. 14 is a drawing for explaining an example of a process performed by a display control unit according to a third embodiment.

The display control unit 1353b causes the group of reference parallax images and the group of parallax images contained in the plurality of groups of parallax images to be output alternately to a plurality of pixels provided in the display unit 132 having the stereoscopic function. More specifically, the display control unit 1353b causes the group of reference parallax images and the group of parallax images contained in the plurality of groups of parallax images to be output so as to alternate pixel by pixel, among the nine columns of pixels provided in the display unit 132. FIG. 14 is a drawing for explaining an example of the process performed by the display control unit 1353*b* according to the third embodiment.

For example, as shown in FIG. 14, the display control unit 1353*b* causes the parallax images corresponding to the 4D data to be output to the pixels in columns 1, 3, 5, and 7, which are among the nine columns of pixels. Further, as shown in FIG. 14, the display control unit 1353*b* causes the reference parallax images to be output to the pixels in columns 2, 4, 6, and 8, which are among the nine columns of pixels.

In other words, the display control unit 1353*b* causes the parallax images corresponding to five parallaxes from among the group of parallax images corresponding to the different time phases in the 4D data to be sequentially output to the pixels in columns 1, 3, 5, 7, and 9. Also, the display control unit 1353*b* causes the parallax images corresponding to four parallaxes in the group of reference parallax images to be continuously output to the pixels in columns 2, 4, 6, and 8.

Figure 15:
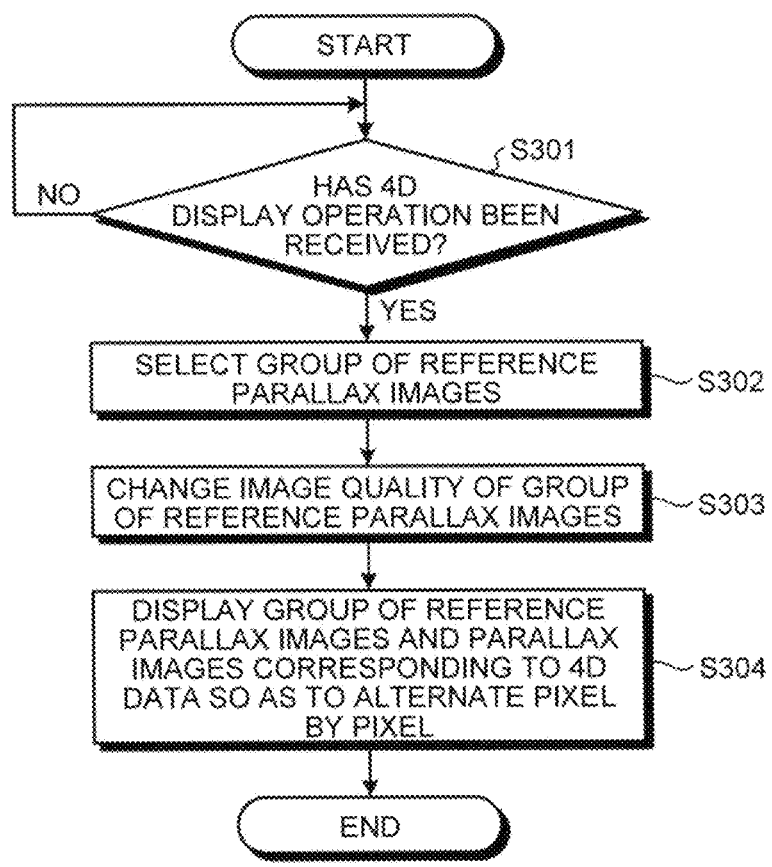
FIG. 15 is a flowchart of a procedure in a process performed by a workstation according to the third embodiment.

Next, a process performed by the workstation 130 according to the third embodiment will be explained, with reference to FIG. 15. FIG. 15 is a flowchart of a procedure in the process performed by the workstation 130 according to the third embodiment. As shown in FIG. 15, in the workstation 130 according to the third embodiment, when having received a display operation for 4D data from the operator via the input unit 131 (step S301: Yes), the image selecting unit 1351 selects a group of reference parallax images out of the 4D data for which the display operation was received (step S302).

After that, the image quality changing unit 1352 changes an image quality (opacity, contrast, lightness, or the like) of the group of reference parallax images selected by the image selecting unit 1351 (step S303). Subsequently, the display control unit 1353*b* causes the group of reference parallax images of which the image quality was changed by the image quality changing unit 1352 and the group of parallax image corresponding to the 4D data to be displayed so as to alternate pixel by pixel (step S304). It should be noted that the workstation 130 according to the third embodiment is in a standby state until a display operation for the 4D data is received (step S301: No).

As explained above, according to the third embodiment, the display control unit 1353*b* causes the group of reference parallax images and the group of parallax images contained in the plurality of groups of parallax images to be output alternately to the plurality of pixels provided in the display unit 132 having the stereoscopic function. As a result, the workstation 130 according to the third embodiment makes it possible to provide the operator with the images obtained by fusing together the group of reference parallax images and the group of parallax images corresponding to the 4D data, without generating superimposed images.

Fourth Embodiment

In the first to the third embodiments described above, the examples are explained in which the group of parallax images corresponding to one time phase is selected as the group of reference parallax images. In a fourth embodiment, an example will be explained in which images obtained by synthesizing together groups of parallax images corresponding to a plurality of time phases are selected as the group of reference parallax images. In the fourth embodiment, the same configuration as that of the control unit 135 according to the first embodiment shown in FIG. 7 is used. Thus, in the fourth embodiment, the control unit that selects the images obtained by synthesizing together the groups of parallax images corresponding to the plurality of time phases as the group of reference parallax images will be referred to as an image selecting unit 1351*a*. In other words, the image selecting unit 1351*a* is obtained by adding additional processes to the image selecting unit 1351 shown in FIG. 7.

First, an application example of a process performed by the workstation 130 according to the fourth embodiment will be explained. In the first to the third embodiments described above, the series of groups of parallax images correspond to the 4D data that gradually renders the blood vessels as the contrast agent flows. In this situation, the images having the highest degree of rendering the blood vessels (i.e., the group of parallax images having the largest total value of brightness levels in the first embodiment) do not necessarily render the structure of the entirety of the blood vessels. In other words, because the blood pumped out of the heart usually flows in the order of an artery→a capillary plexus→a vein, the images having the highest degree of rendering arteries are considered to be different from the images having the highest degree of rendering veins. To cope with this situation, the workstation 130 according to the fourth embodiment exercises control so that such images that render the structure of the entirety of the blood vessels are used as the group of reference parallax images.

The image selecting unit 1351*a* extracts two or more groups of parallax images from the plurality of groups of parallax images and selects images obtained by synthesizing together the two or more extracted groups of parallax images as the group of reference parallax images. More specifically, the image selecting unit 1351*a* extracts a group of parallax images having the highest degree of rendering the arteries and a group of parallax images having the highest degree of rendering the veins from the 4D data and generates the group of reference parallax images by synthesizing together the parallax images corresponding to mutually the same viewpoint positions between the two extracted groups of parallax images.

Figure 16:
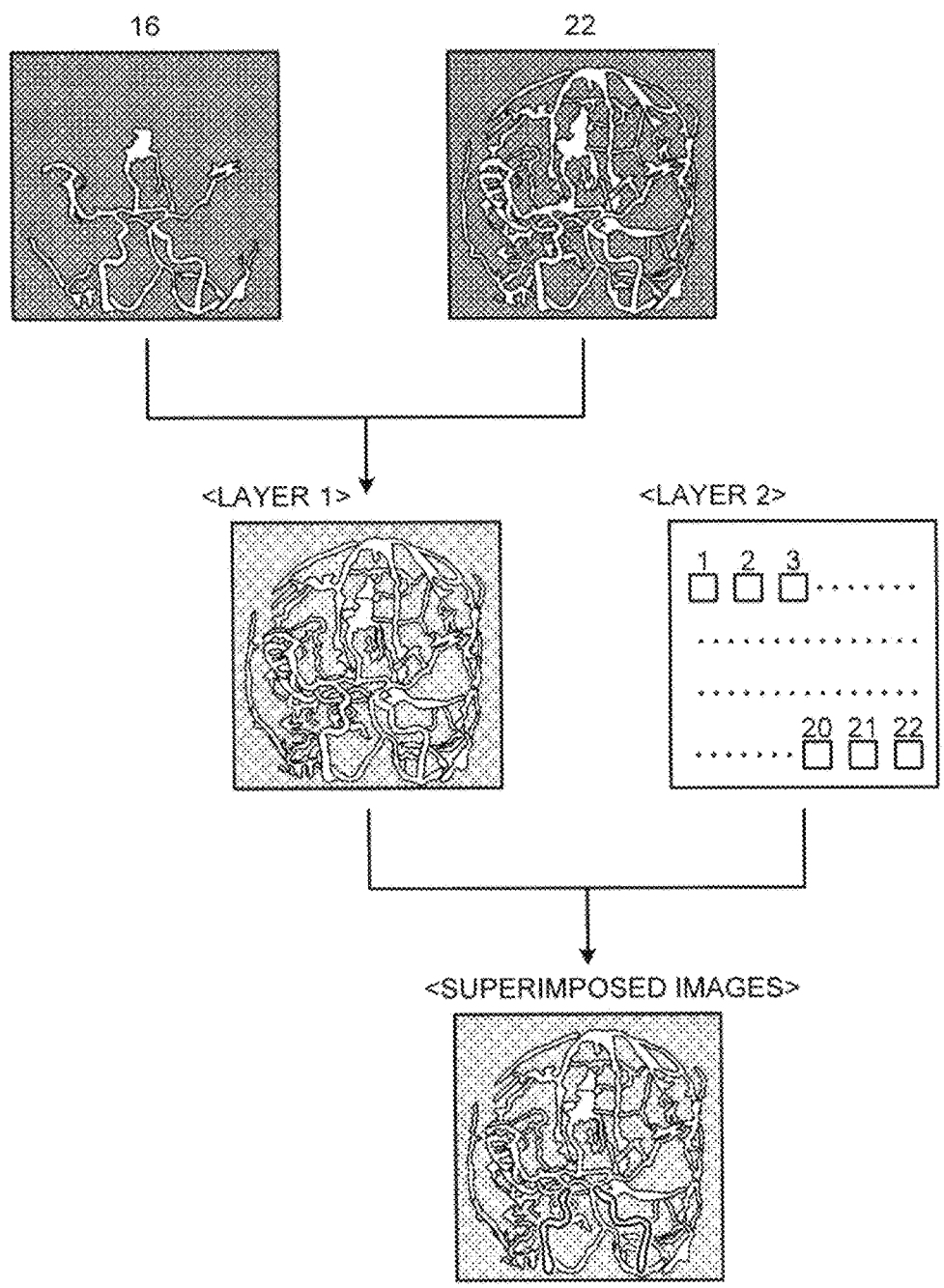
FIG. 16 is a drawing for explaining an example of a process performed by an image selecting unit according to a fourth embodiment.

FIG. 16 is a drawing for explaining an example of the process performed by the image selecting unit 1351*a* according to the fourth embodiment. FIG. 16 illustrates an example in which two groups of parallax images are extracted from the 4D data shown in FIG. 8 (i.e., the image data in the twenty-three frames indicating the state of the blood vessels rendered by the contrast agent) so that the synthesized images are used as the group of reference parallax images. For example, as shown in FIG. 16, the image selecting unit 1351*a* extracts the group of parallax images in the sixteenth frame as the group of parallax images having the highest degree of rendering the arteries, from the image data corresponding to the twenty-three frames. Further, the image selecting unit 1351*a* extracts the group of parallax images in the twenty-second frame as the group of parallax images having the highest degree of rendering the veins from the image data corresponding to the twenty-three frames. After that, the image selecting unit 1351*a* uses the images obtained by synthesizing together the extracted group of parallax images corresponding to the sixteenth frame and the extracted group of parallax images corresponding to the twenty-second frame, as the group of reference parallax images.

In other words, as shown in FIG. 16, the image quality changing unit 1352 changes an image quality (i.e., at least one selected from the opacity, the contract, and the lightness) of the two groups of parallax images synthesized by the image selecting unit 1351*a*. After that, as shown in FIG. 16, the display control unit 1353 causes the group of reference parallax images to be continuously displayed in layer 1 and causes the groups of parallax images corresponding to the 4D data to be sequentially displayed in layer 2 along the time sequence. As explained here, the workstation 130 according to the fourth embodiment is able to cause the images in the certain time phases to be serially played back while being sequentially superimposed along the time sequence on the images rendering both the arteries and the veins.

In this situation, the image selecting unit 1351*a* may receive a selection indicating which one of the groups of parallax images should be used as the group of reference parallax images from, for example, the operator. In that situation, the image selecting unit 1351*a*, for example, displays the series of groups of parallax images on the display unit 132 in the form of a thumbnail, so that a selection made by the operator can be received.

In another example, another arrangement is also acceptable in which the image selecting unit 1351*a* stores therein, in advance, a time (expressed with an elapsed time period since the beginning of the contrast enhancement, e.g., x seconds later) at which the images having the highest degree of rendering the arteries are expected to be acquired and a time (e.g., y seconds later) at which the images having the highest degree of rendering the veins are expected to be acquired, so as to select a group of parallax images obtained by performing a volume rendering process on the volume data acquired at these times as the group of reference parallax images. As for these times, for example, times that are determined based on empirical values or experimental values may be input by the operator.

In yet another example, the image selecting unit 1351*a* may select the group of reference parallax images by performing an image analysis. In that situation, for example, the image selecting unit 1351*a* identifies the frame in which such a site (e.g., the corpus callosum) that serves as a point at which the bloodstream makes a transition from an artery to a vein starts being rendered, by performing an image analysis on the pieces of volume data. After that, for example, the image selecting unit 1351*a* selects the group of parallax images in the frame immediately preceding the specified frame, as a group of parallax images made up of the images having the highest degree of rendering the arteries. Further, in the same manner as in the first embodiment, the image selecting unit 1351*a* calculates a total value of the brightness levels of each of the groups of parallax images and selects a group of parallax images having the highest brightness level as a group of reference parallax made up of the images having the highest degree of rendering the veins.

In the first to the fourth embodiments described above, the groups of parallax images rendering the head of the patient are used as the examples. However, the exemplary embodiments are not limited to these examples and may be similarly applied to any other site. In the following sections, a modification example of the fourth embodiment will be explained, while using an example with groups of parallax images rendering the abdomen of a patient.

Figure 17:
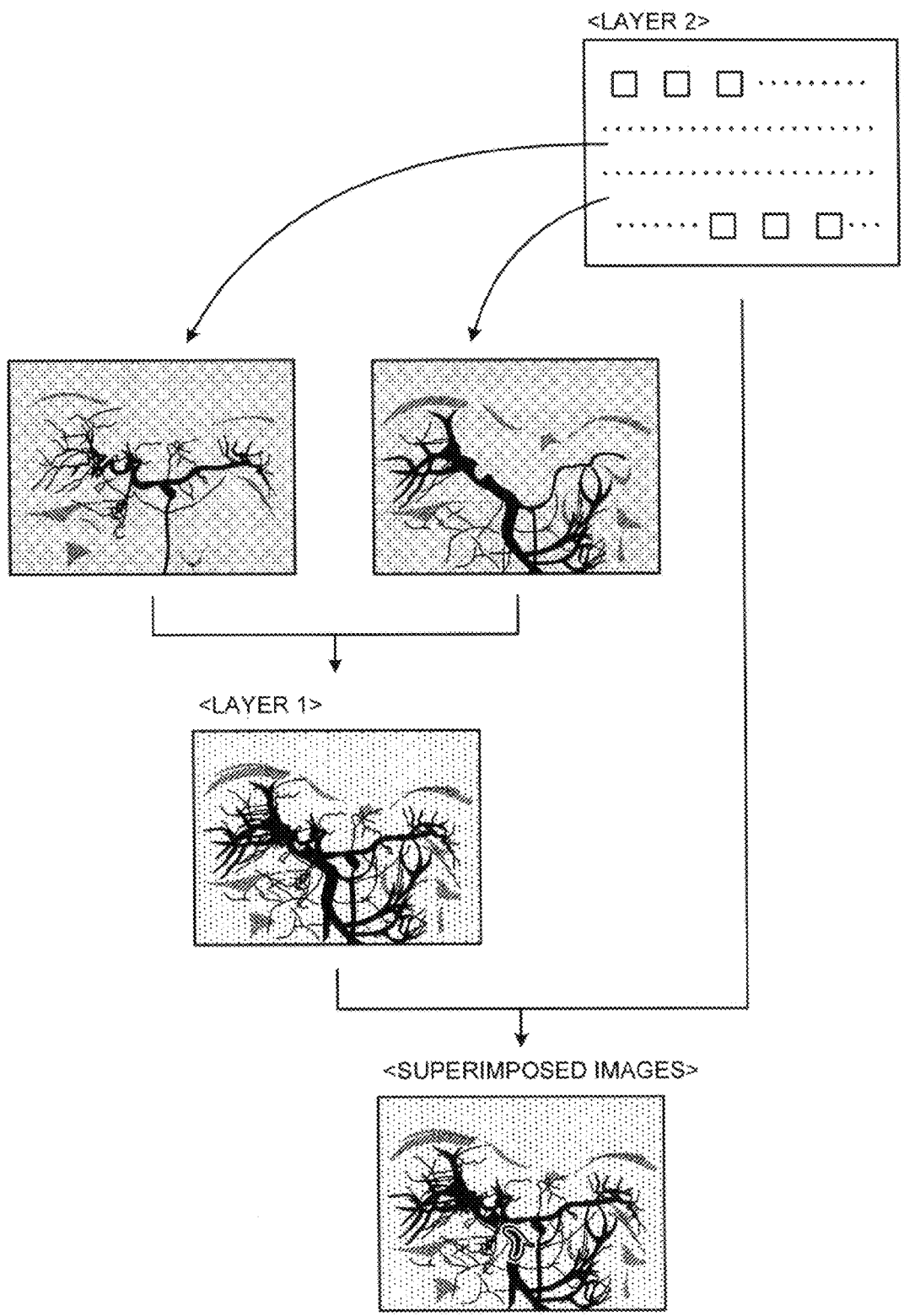
FIG. 17 is a drawing for explaining a modification example of the fourth embodiment.

FIG. 17 is a drawing for explaining the modification example of the fourth embodiment. The blood pumped out of the heart usually flows in the order of an artery→a capillary plexus→a vein; however, in some situations, the blood flows in the order of an artery→a capillary plexus→a portal vein→a capillary plexus→a vein. In the following sections, the term "portal veins" is used to refer to the blood vessels in such a part where the blood having flowed through a digestive tract flows into the liver.

The workstation 130 according to the modification example of the fourth embodiment extracts the group of parallax images having the highest degree of rending the arteries and the group of parallax images having the highest degree of rendering the portal veins and uses the images obtained by synthesizing together the two extracted groups of parallax images as a group of reference parallax images. Because the group of reference parallax images are the result of adding together the group of parallax images having the highest degree of rendering the arteries and the group of parallax images having the highest degree of rendering the portal veins, the group of reference parallax images render the structure of the entirety of the blood vessels in the image taking region.

For example, as shown in FIG. 17, the workstation 130 according to the modification example of the fourth embodiment extracts two groups of parallax images from the series of groups of parallax images. After that, the workstation 130 generates a group of reference parallax images by synthesizing together parallax images corresponding to mutually the same viewpoint positions between the extracted groups of reference parallax images. In an example with the abdomen, because impacts from the respiratory movements are anticipated, it is desirable to perform a position alignment process when generating the group of reference parallax images. It is possible to realize the position alignment process by using any of the publicly known techniques. For example, the workstation 130 may perform the position alignment process on the two groups of parallax images, by calculating a degree of correlation between the two groups of parallax images while using such a site (e.g., a bone) that is less impacted by the respiratory movements as a comparison target. Further, the workstation 130 changes at least one selected from the opacity, the contrast, and the lightness of the group of reference parallax images.

After that, as shown in FIG. 17, the workstation 130 causes the group of reference parallax images to be continuously displayed in layer 1 and causes the other groups of parallax images corresponding to the 4D data to be sequentially displayed in layer 2 along the time sequence. As explained here, the workstation 130 is able to cause the images in the certain time phases to be serially played back while being sequentially superimposed along the time sequence on the images rendering both the arteries and the portal veins.

The selection of the groups of parallax images made by the image selecting unit 1351*a* is the same as in the example with the head of the patient described above. In other words, the image selecting unit 1351*a* may receive a selection indicating which one of the groups of parallax images should be used as the group of reference parallax images from, for example, the operator. Also, for example, another arrangement is acceptable in which the image selecting unit 1351*a* stores therein, in advance, a time (expressed with an elapsed time period since the beginning of the contrast enhancement, e.g., 20 seconds later) at which the images having the highest degree of rendering the arteries are expected to be acquired and a time (e.g., 50 seconds later) at which the images having the highest degree of rendering the portal veins are expected to be acquired, so as to select a group of parallax images generated from the volume data acquired at these times as the group of reference parallax images. As for these times, for example, times that are determined based on empirical values or experimental values may be input by the operator. Furthermore, the image selecting unit 1351*a* may select a group of reference parallax images by, for example, performing an image analysis.

In the fourth embodiment and the modification example of the fourth embodiment, the examples are explained in which the group of reference parallax images is obtained by synthesizing together the two groups of parallax images. However, the exemplary embodiments are not limited to these examples. The number of groups of parallax images to be synthesized together may be three or more. For example, the image selecting unit 1351*a* may obtain a group of reference parallax images by synthesizing together three of more groups of parallax images selected by the operator. In that situation, the workstation 130 generates the group of reference parallax images by synthesizing together three parallax images corresponding to mutually the same viewpoint positions among the three groups of parallax images.

Further, in the fourth embodiment, it is indicated that the selection of the reference volume data may be received from the operator. However, the exemplary embodiments are not limited to this example. For example, the image selecting unit 1351*a* may receive an instruction from the operator for the purpose of correcting the selection of reference volume data.

For example, the image selecting unit 1351*a* first displays, on the display unit 132, a group of reference parallax images that are automatically selected based on the time or an image analysis. Subsequently, for example, the operator visually recognizes the group of reference parallax images, and if he/she accepts the group of reference parallax images, he/she presses an "accept" button, whereas if he/she wishes to change the selection, he/she presses a "re-select" button. If the "re-select" button is pressed, the image selecting unit 1351*a* displays again the series of groups of parallax images on the display unit 132 in the form of a thumbnail so as to receive a selection from the operator. Also, in that situation, the image selecting unit 1351*a* may indicate the automatically-selected group of reference parallax images within the displayed thumbnail. As another example, the image selecting unit 1351*a* may display, in the form of a thumbnail, only such groups of parallax images that are in a predetermined range on the time sequence with respect to the automatically-selected group of reference parallax images. With this arrangement, the operator is able to take the automatically-selected group of reference parallax images into consideration.

The arrangement in which an instruction from the operator is received for the purpose of correcting the selection of reference volume data is applicable to any of the other exemplary embodiments.

Fifth Embodiments

The first, the second, the third, and the fourth embodiments have thus been explained. The disclosed techniques may be implemented in other various embodiments besides the first, the second, the third, and the fourth embodiments.

In the exemplary embodiments described above, the examples are explained in which the group of parallax images rendering the display target object in the manner closest to showing the whole picture thereof is selected as the group of reference parallax images from among the plurality of groups of parallax images contained in the 4D data. However, the disclosed techniques are not limited to these examples. For example, a group of reference parallax images may be selected based on chronological changes of the display target object. In one example, a group of parallax images corresponding to the time phase in which the bloodstream makes a transition from an artery to a vein may be selected as the group of reference parallax images.

In the exemplary embodiments described above, the examples are explained in which the group of parallax images corresponding to the 4D data is superimposed onto the group of reference parallax images. However, the disclosed techniques are not limited to these examples. For example, the group of reference parallax images may be superimposed onto the group of parallax images corresponding to the 4D data.

In the exemplary embodiments described above, the examples are explained in which the image quality of the group of reference parallax images is changed. However, the disclosed techniques are not limited to these examples. For example, an image quality of the groups of parallax images corresponding to the 4D data may be changed. In that situation, the image qualities of all of the groups of parallax images corresponding to the 4D data are changed, so as to superimpose the image-quality-changed groups of parallax images onto the group of reference parallax images of which the image quality has not been changed.

In the exemplary embodiments described above, the examples are explained in which the image quality is changed of either the group of reference parallax images or the group of parallax images corresponding to the 4D data. However, the disclosed techniques are not limited to these examples. For example, the image qualities may be changed of both the group of reference parallax images and the group of parallax images corresponding to the 4D data. In that situation, the image qualities are changed in such a manner that the image qualities are different between the group of reference parallax images and the group of parallax images corresponding to the 4D data.

In the exemplary embodiments described above, the examples are explained in which, when the image quality is changed, at least one selected from the opacity, the contrast, and the lightness is changed. However, the disclosed techniques are not limited to these examples. For example, the colors, the density of the colors, or the display mode may be changed, in place of or in addition to the change made to the image quality described above. It is acceptable to change the image quality of one selected from between the group of reference parallax images and the group of parallax images corresponding to the 4D data. Alternatively, it is also acceptable to change the image qualities of both the group of reference parallax images and the group of parallax images corresponding to the 4D data.

For example, in the first embodiment, the group of reference parallax images represents the images having the highest ratio calculated as a ratio of the area in which the blood vessels are rendered. In that situation, for example, for the purpose of making it easy for the operator to distinguish the color of the blood vessels rendered in the group of reference parallax images from the color of the blood vessels rendered in the group of parallax images corresponding to the 4D data, the image quality changing unit 1352 may make adjustments so that the colors of the blood vessels rendered in the group of reference parallax images and in the group of parallax images corresponding to the 4D data are different from each other. For example, the image quality changing unit 1352 makes an adjustment so that the color of the blood vessels rendered in the group of reference parallax images is "white". In that situation, the whole picture of the blood vessels is rendered in "white", whereas the manner in which the contrast agent flows (i.e., the manner in which the blood flows) is rendered in, for example "red". The display control unit 1353 is thus able to provide the operator with a moving picture that shows the blood as if the blood is flowing through a straw.

Further, for example, the image quality changing unit 1352 may adjust the density of the color of the blood vessels. In that situation, for example, the image quality changing unit 1352 makes adjustments so as to make the density of the color of the blood vessels rendered in the group of reference parallax images lower and to make the density of the color of the blood vessels rendered in the group of parallax images corresponding to the 4D data higher. In that situation, the whole picture of the blood vessels is rendered with a lower color density, whereas the manner in which the contrast agent flows is rendered with a higher color density.

In yet another example, the image quality changing unit 1352 may generate a wire-frame-like whole picture of the blood vessels by performing an image analysis on the group of reference parallax images. In that situation, the display control unit 1353 superimposes a group of parallax images corresponding to the 4D data onto the group of reference parallax images rendered like a wire frame. For example, by performing an image analysis on the volume data of the group of reference parallax images by performing a threshold operation of CT values or the like, the image quality changing unit 1352 extracts the blood vessels from the volume data. Subsequently, the image quality changing unit 1352 further extracts lines obtained by connecting the centers of the extracted blood vessels as "core lines" and renders the "core lines" as the whole picture of the blood vessels. In this situation, the whole picture of the blood vessels are rendered like a wire frame that only has the "core lines", so that the blood is rendered as flowing in the surroundings thereof.

Such adjustments of the colors, the density of the colors, and the display mode may be applied to any other exemplary embodiments. For example, in the second embodiment, when displaying the group of parallax images corresponding to the 4D data, the group of reference parallax images, and the superimposed images on a single screen, the display control unit 1353*a* may realize the display of each set of images by using the colors, the density of the colors, and the display mode that have been adjusted by the image quality changing unit 1352. Also, as another example, in the third embodiment, when displaying images obtained by fusing together the group of reference parallax images and the group of parallax images corresponding to the 4D data, the display control unit 1353*b* may realize the display of each set of images by using the colors, the density of the colors, and the display mode that have been adjusted by the image quality changing unit 1352. In yet another example, in the fourth embodiment, when changing the image quality of two groups of parallax images that have been synthesized by the image selecting unit 1351, the image quality changing unit 1352 may adjust the colors, the density of the colors, and the display mode.

Figure 18:
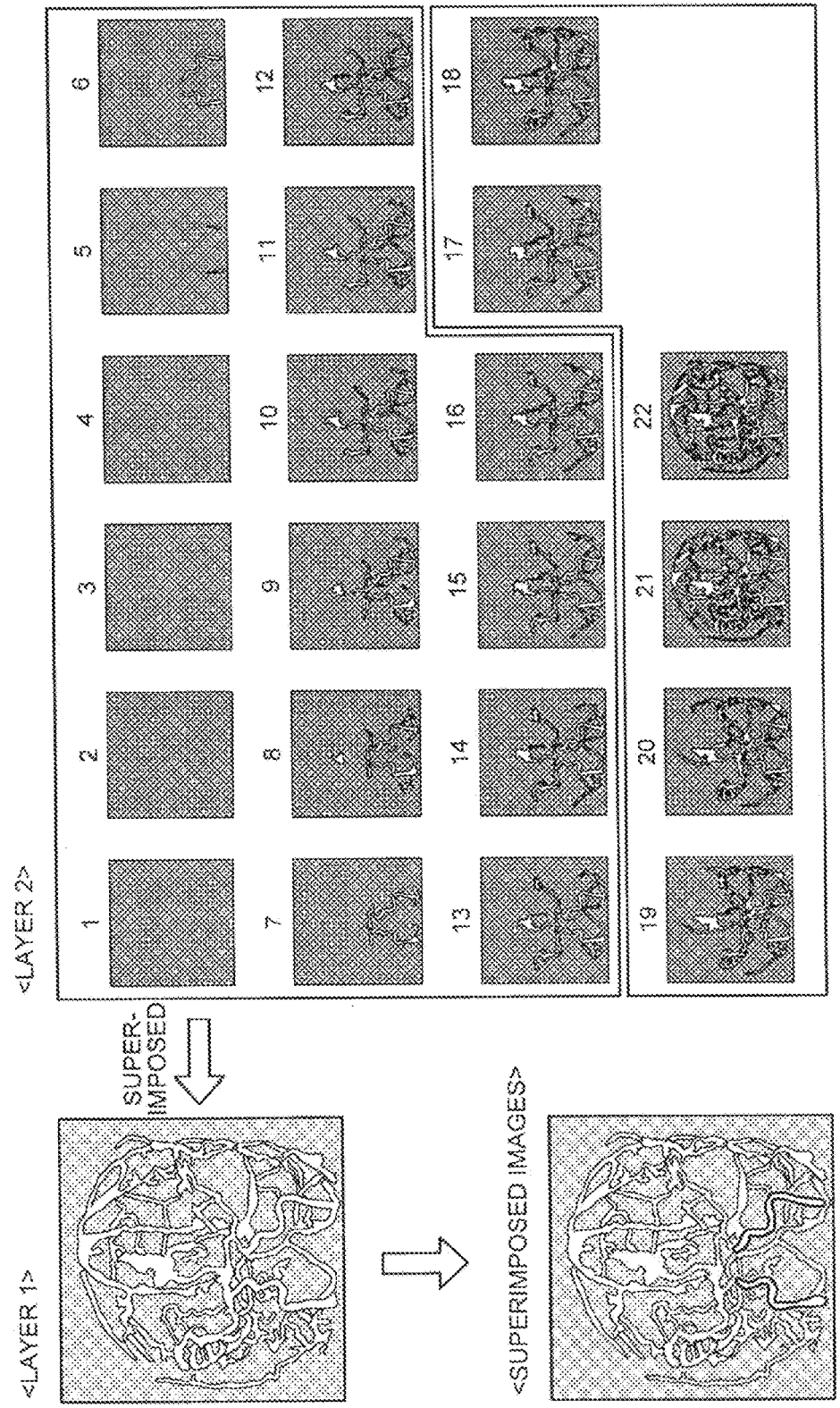
FIG. 18 is a drawing for explaining a modification example of a fifth embodiment.

In the exemplary embodiments described above, the examples are explained in which the group of parallax images corresponding to the 4D data is simply superimposed onto the reference parallax images. However, the disclosed techniques are not limited to these examples. For instance, another example is acceptable in which a process such as making a color map is applied to the group of parallax images corresponding to the 4D data to be superimposed. FIG. 18 is a drawing for explaining a modification example of the fifth embodiment. For example, the disclosed techniques may have an arrangement in which, as shown in FIG. 18, of the groups of parallax images corresponding to the twenty-two frames in layer 2 to be superimposed onto the group of reference parallax images in layer 1, the first to the sixteenth frames are displayed in red, whereas the seventeenth to the twenty-second frame are displayed in blue. Realizing the display in this manner makes it possible for the viewer to, for example, distinguish the arteries from the veins at a glance.

In the exemplary embodiments described above, the examples are explained in which the workstation 130 selects the group of reference parallax images out of the 4D data and displays the 4D data while using the selected group of reference parallax images and the group of parallax images corresponding to the 4D data. However, the disclosed techniques are not limited to these examples. For example, another arrangement is acceptable in which the medical image diagnosis apparatus 110 selects a group of reference parallax images out of the 4D data and displays the 4D data while using the selected group of reference parallax images and the group of parallax images corresponding to the 4D data. Yet another arrangement is also acceptable in which the medical image diagnosis apparatus 110 or the workstation 130 selects a group of reference parallax images out of the 4D data so that the terminal apparatus 140 displays the 4D data while using the selected group of reference parallax images and the group of parallax images corresponding to the 4D data.

Further, in the exemplary embodiments described above, the terminal apparatus 140 is explained as an apparatus configured to, for example, display the medical images and the like obtained from the image storing apparatus 120. However, the disclosed techniques are not limited to this example. For example, the terminal apparatus 140 may be directly connected to the medical image diagnosis apparatus 110 or to the workstation 130.

Further, in the exemplary embodiments described above, the examples are explained in which the workstation 130 obtains the volume data from the image storing apparatus 120. However, the disclosed techniques are not limited to these examples. For example, the workstation 130 may obtain the volume data from the medical image diagnosis apparatus 110.

As explained above, according to the exemplary embodiments, the system, the apparatus, and the method for image processing and the medical image diagnosis apparatus according to an aspect of the embodiments make it possible to have the three-dimensional information easily understood, even when the chronological image data is displayed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing system comprising:
   a selecting circuit configured to select a reference group of parallax images of a target object to be used as a reference, from among a plurality of groups of parallax images generated from volume data of the target object taken chronologically, wherein each of the groups of parallax images is a plurality of parallax images captured from a plurality of viewpoints of the volume data of the target object;
   an image characteristic changing circuit configured to change an image characteristic of at least one of the reference group of parallax images selected by the selecting circuit and other groups of parallax images of the plurality of groups of parallax images; and
   a display control circuit configured to cause superimposed images to be displayed that are formed by combining the other groups of parallax images with the reference group of parallax images, wherein the image characteristic of the reference group of parallax images, the other groups of parallax images, or both the reference group of parallax images and the other groups of parallax images is changed by the image characteristic changing circuit.

2. The image processing system according to claim 1, wherein the selecting circuit is configured to select, as the reference group of parallax images, a group of parallax images having a highest ratio calculated as a ratio of an area in which a display target object is rendered to an entire area of each image, from among the plurality of groups of parallax images.

3. The image processing system according to claim 1, wherein the selecting circuit is configured to select, as the reference group of parallax images, images obtained by extracting two or more groups of parallax images from the plurality of groups of parallax images and synthesizing together the two or more extracted groups of parallax images.

4. The image processing system according to claim 1, wherein the image characteristic changing circuit is configured to change at least one characteristic selected from opacity, contrast, and lightness of the reference group of parallax images or the other groups of parallax images.

5. The image processing system according to claim 1, wherein the display control circuit is configured to cause the reference group of parallax images and the other groups of parallax images to be output alternately to a plurality of pixels provided in a display circuit having a stereoscopic function.

6. The image processing system according to claim 1, wherein the superimposed images are obtained by superimposing the other groups onto the reference group of parallax images.

7. The image processing system according to claim 6, wherein the display control circuit is configured to cause the reference group of parallax images, the superimposed images, and the other groups of parallax images to be displayed at mutually-different angles with respect to a display surface of a display having a stereoscopic function.

8. The image processing system according to claim 1, wherein the display control circuit is configured to cause superimposed images to be displayed that include the reference group of parallax images displayed continuously with the other groups of parallax images displayed sequentially along a time sequence.

9. The image processing system according to claim 1, wherein each of the reference group of parallax images and the other groups of parallax images provides a same view of the target object at a different time.

10. An image processing apparatus comprising:
a selecting circuit configured to select a reference group of parallax images of a target object to be used as a reference, from among a plurality of groups of parallax images generated from volume data of the target object taken chronologically, wherein each of the groups of parallax images is a plurality of parallax images captured from a plurality of viewpoints of the volume data of the target object;
an image characteristic changing circuit configured to change an image characteristic of at least one of the reference group of parallax images selected by the selecting circuit and other groups of parallax images of the plurality of groups of parallax images; and
a display control circuit configured to cause superimposed images to be displayed that are formed by combining the other groups of parallax images with the reference group of parallax images, wherein image quality of the reference group of parallax images, the other groups of parallax images, or both the reference group of parallax images and the other groups of parallax images is changed by the image characteristic changing circuit.

11. An image processing method comprising:
selecting a reference group of parallax images to be used as a reference, from among a plurality of groups of parallax images generated from volume data of the target object taken chronologically, wherein each of the groups of parallax images is a plurality of parallax images captured from a plurality of viewpoints of the volume data of the target object at a particular time-point;
changing an image characteristic of at least one of the reference group of parallax images and other groups of parallax images of the plurality of groups of parallax images; and
causing superimposed images to be displayed that are formed by combining the other groups of parallax images with the reference group of parallax images, wherein the image characteristic of the reference group of parallax images, the other groups of parallax images, or both the reference group of parallax images and the other groups of parallax images is changed.

12. A medical image diagnosis apparatus comprising:
a selecting circuit configured to select a reference group of parallax images of a target object to be used as a reference, from among a plurality of groups of parallax images generated from volume data of the target object taken chronologically, wherein each of the groups of parallax images is a plurality of parallax images captured from a plurality of viewpoints of the volume data of the target object;
an image characteristic changing circuit configured to change an image characteristic of at least one of the reference group of parallax images selected by the selecting circuit and other groups of parallax images of the plurality of groups of parallax images; and
a display control circuit configured to cause superimposed images to be displayed that are formed by combining the other groups of parallax images with the reference group, wherein the image characteristic of the reference group of parallax images, the other groups of parallax images, or both the reference group of parallax images and the other groups of parallax images is changed by the image characteristic changing circuit.

* * * * *